United States Patent
Knight

(10) Patent No.: US 10,668,472 B2
(45) Date of Patent: Jun. 2, 2020

(54) FLUID RECEPTACLES

(71) Applicant: GEN-PROBE INCORPORATED, San Diego, CA (US)

(72) Inventor: Byron Knight, San Diego, CA (US)

(73) Assignee: Gen-Probe Incorporated, San Diego, CA (US)

( * ) Notice: Subject to any disclaimer, the term of this patent is extended or adjusted under 35 U.S.C. 154(b) by 137 days.

(21) Appl. No.: 15/926,633

(22) Filed: Mar. 20, 2018

(65) Prior Publication Data

US 2018/0290141 A1  Oct. 11, 2018

Related U.S. Application Data

(60) Provisional application No. 62/474,465, filed on Mar. 21, 2017.

(51) Int. Cl.
*B01L 3/00* (2006.01)
*B65D 51/00* (2006.01)
(Continued)

(52) U.S. Cl.
CPC .............. *B01L 3/523* (2013.01); *B01L 3/502* (2013.01); *B01L 3/50825* (2013.01); *B01L 3/565* (2013.01); *B65D 1/24* (2013.01); *B65D 43/0235* (2013.01); *B65D 51/002* (2013.01); *B65D 51/20* (2013.01); *G01N 35/1002* (2013.01); *G01N 35/1079* (2013.01); *B01L 2200/025* (2013.01); *B01L 2200/0684* (2013.01);
(Continued)

(58) Field of Classification Search
CPC ........... B01L 3/523; B01L 3/502; B65D 1/24; B65D 43/0235
See application file for complete search history.

(56) References Cited

U.S. PATENT DOCUMENTS 4,772,558 A    9/1988  Hammann
5,573,951 A *  11/1996 Gombrich .............. B01L 3/502
                                                          435/287.3
(Continued)

FOREIGN PATENT DOCUMENTS

WO   WO-2018005241 A1 *  1/2018  ........... B65D 51/002

OTHER PUBLICATIONS

PCT, International Search Report and Written Opinion, International Application No. PCT/US2018/023352, dated Jun. 6, 2018.

*Primary Examiner* — P. Macade Nichols
(74) *Attorney, Agent, or Firm* — Sterne, Kessler, Goldstein & Fox P.L.L.C

(57) ABSTRACT

A receptacle for minimizing evaporation of a fluid includes a single-piece body, a fluid-tight seal, a penetrable septum, and a lid coupled to the body. The body includes a first chamber having a first opening. The fluid-tight seal is affixed to a surface of the body that defines the first opening. The fluid-tight seal covers the first opening and is frangible. The septum covers the first opening and the fluid-tight seal. The lid has an opening axially aligned with the first opening. The septum comprises slits forming flaps The first chamber can be the only chamber containing a fluid, or the single-piece body may also include another chamber containing the fluid. The other chamber can be in fluid communication with the first chamber via a conduit. The fluid-tight seal can also cover the opening of the second chamber.

44 Claims, 13 Drawing Sheets

(51) Int. Cl.
  *B65D 1/24*   (2006.01)
  *B65D 43/02*  (2006.01)
  *B65D 51/20*  (2006.01)
  *G01N 35/10*  (2006.01)
  *B65D 47/20*  (2006.01)

(52) U.S. Cl.
  CPC . *B01L 2200/0689* (2013.01); *B01L 2200/142* (2013.01); *B01L 2200/16* (2013.01); *B01L 2300/044* (2013.01); *B01L 2300/0861* (2013.01); *B65D 47/2025* (2013.01); *B65D 2251/0018* (2013.01); *B65D 2251/0093* (2013.01)

(56) References Cited

U.S. PATENT DOCUMENTS

| | | | |
|---|---|---|---|
| 6,569,120 B1 * | 5/2003 | Green | A61B 17/34 |
| | | | 137/849 |
| 9,075,039 B2 * | 7/2015 | Hansen | A61B 10/0096 |
| 2007/0034592 A1 | 2/2007 | Pavlovic et al. | |
| 2013/0112016 A1 | 5/2013 | Hansen | |
| 2015/0362515 A1 | 12/2015 | Buse et al. | |

* cited by examiner

FLUID RECEPTACLES

CROSS-REFERENCE TO RELATED APPLICATIONS

The present application claims the benefit of priority under 35 U.S.C. § 119(e) based on U.S. Provisional Application Ser. No. 62/474,465 filed on Mar. 21, 2017, the entire content of which is also incorporated herein by reference.

BACKGROUND

Field

Embodiments of this disclosure relate to receptacles that contain a fluid.

Background

Sample processing instruments can use a variety of fluids. These fluids are typically contained within a chamber of a receptacle and, in some applications, are sealed within the chamber by a seal. These fluids can evaporate when exposed to atmospheric conditions, for example, after the seal is broken or omitted. It may be desirable in some applications to reduce or eliminate evaporation of the fluid. For example, evaporation may expedite the rate the fluid volume is reduced or may alter the concentration.

SUMMARY

In some embodiments, a receptacle for minimizing evaporation of a fluid includes a single-piece body. The body includes a first chamber containing a first portion of a fluid. The first chamber has a first chamber volume and a first chamber opening. The body also includes a second chamber containing a second portion of the fluid. The second chamber has a second chamber volume, and a second chamber opening separate from the first chamber opening. The body also includes a conduit configured to allow fluid communication between the first chamber and the second chamber. The receptacle also includes one or more fluid-tight seals affixed to a surface of the body. The surface of the body defines the first and second chamber openings. At least a portion of the one or more fluid-tight seals covers the first chamber opening and is frangible. The receptacle also includes a penetrable septum covering the first chamber opening and the portion of the one or more fluid-tight seals. The receptacle also includes a lid having an opening axially aligned with the first chamber opening and coupled to the body such that at least a portion of the septum is disposed between the lid and the one or more fluid-tight seals. The septum includes slits forming flaps.

In some embodiments, the septum does not cover any portion of the second chamber opening. The second chamber volume may be greater than the first chamber volume. The second chamber opening may be larger than the first chamber opening. The fluid may be at substantially the same level in each of the first and second chambers.

In some embodiments, the receptacle is self-standing. For example, the receptacle may include a flat bottom surface. Or for example, the receptacle may include a skirt circumscribing at least a portion of a bottom end portion of the body.

In some embodiments, the one or more fluid-tight seals include a metallic foil. In some embodiments, the one or more fluid-tight seals consist of a single seal.

In some embodiments, the single-piece body includes a wall defining at least a portion of the first chamber and at least a portion of the second chamber, and the conduit includes an opening defined by the wall. In some embodiments, the conduit includes a channel extending between the first chamber and the second chamber. The conduit can be adjacent a bottom chamber-defining surface of the first chamber and a bottom chamber-defining surface of the second chamber, in some embodiments.

In some embodiments, the body also includes a second conduit configured to allow fluid communication between the first chamber and the second chamber. The second conduit can be on a side of the body opposite of the first conduit. In some embodiments, the second conduit can include a recess defined by the surface of the body. The recess can be a slot extending between the first chamber and the second chamber.

The lid can be configured to engage the body in a snap-fit connection in some embodiments. The lid can also include a solid portion covering the second chamber opening.

In some embodiments, the slits of the septum bisect each other at a point aligned with a center of the opening of the lid. The flaps are biased to be substantially positioned in a single plane in some embodiments. The slits can be equally spaced apart about an axis. Each slit can be positioned inside a perimeter of the opening of the lid.

In some embodiments, the lid includes a surface facing the single-piece body, and defining a recess configured to receive at least a portion of the septum. When the septum is received within the recess, the septum is coupled to the lid. The recess can be configured to create a friction fit or an interference fit with the septum. The periphery of the recess may include protrusions that engage the septum to create an interference fit.

In some embodiments, an exterior portion of the septum is between (a) the surface of the body defining the first chamber opening and (b) a portion of the lid; and an interior portion of the septum covers the first chamber opening.

The septum may include a first layer and a second layer in some embodiments. The first layer may be polytetrafluoroethylene. The second layer may be silicone. The second layer can be arranged between the first chamber opening and the first layer.

The fluid contained within the receptacle can be a reagent for performing an assay on a sample. For example, the reagent can be at least one of a solution for reconstituting a dried reagent, an elution buffer, or oil.

In some embodiments, the body of the receptacle may only define a single chamber for containing a fluid. For example, the second chamber and the first and second conduits mentioned in the above embodiments may be omitted from the body. As such, the receptacle may include a body defining only one chamber having a chamber opening, a fluid-tight seal affixed to the body and fluidly sealing the chamber, a septum covering the chamber opening and the fluid-tight seal, and a lid having an opening axially aligned with the chamber opening and coupled to the body such that the septum is disposed between the lid and the fluid-tight seal. The septum may include slits forming flaps.

In some embodiments, a method of transferring a fluid includes aspirating, using a fluid transfer mechanism, at least a portion of fluid contained in the first chamber of a receptacle according to any of the above described embodiments, including for example, the single chamber embodiments and the dual chamber embodiments.

For example, in some embodiments, the method includes the steps of inserting a fluid retrieval device into a first chamber of a first receptacle that contains a first portion of the fluid. This inserting step may include passing the fluid retrieval device through a penetrable septum covering a first chamber opening of the first chamber, and penetrating a frangible seal sealing the first chamber opening. The frangible seal can be between the first chamber opening and the septum. The method also includes aspirating some or all of the first portion of the fluid contained in the first chamber with the fluid retrieval device. A second portion of the fluid can flow into the first chamber from a second chamber of the first receptacle. The second chamber is in fluid communication with the first chamber, and levels of the fluid can be substantially the same in the first and second chambers after the second portion of the fluid flows into the first chamber. And the method can include withdrawing the fluid retrieval device from the first chamber and the septum such that the septum substantially covers the first chamber opening. The receptacle can be any one of the above described embodiments.

In some embodiments, the method also includes, after the aspirating step, the step of dispensing an aspirated portion of the first portion of the fluid into a second receptacle using the fluid retrieval device. The second receptacle may contain an assay reagent. The assay reagent may include a dried reagent, and the fluid may include a solution for reconstituting the dried reagent.

In some embodiments, the aspirated fluid comprises at least one of a solution for reconstituting a dried reagent, an elution buffer, and oil.

In some embodiments, the withdrawing step includes disengaging the fluid retrieval device from flaps of the septum, such that the flaps return to a position that substantially covers the first chamber opening.

In some embodiments, the method also includes the steps of inserting, a second time, the fluid retrieval device into the first chamber such that the fluid retrieval device passes through the penetrable septum covering the first chamber opening of the first chamber; aspirating, a second time, some or all of the first portion of the fluid contained in the first chamber with the fluid retrieval device; and withdrawing, a second time, the fluid retrieval device from the first chamber and the septum such that the septum substantially covers the first chamber opening.

DESCRIPTION OF THE FIGURES

The accompanying drawings, which are incorporated herein and form a part of the specification, illustrate embodiments of the present disclosure by way of example, and not by way of limitation. Together with the description they further serve to explain principles of the invention and enable a personal skilled in the pertinent art to make and use the invention.

DETAILED DESCRIPTION OF THE INVENTION

Figure 1:
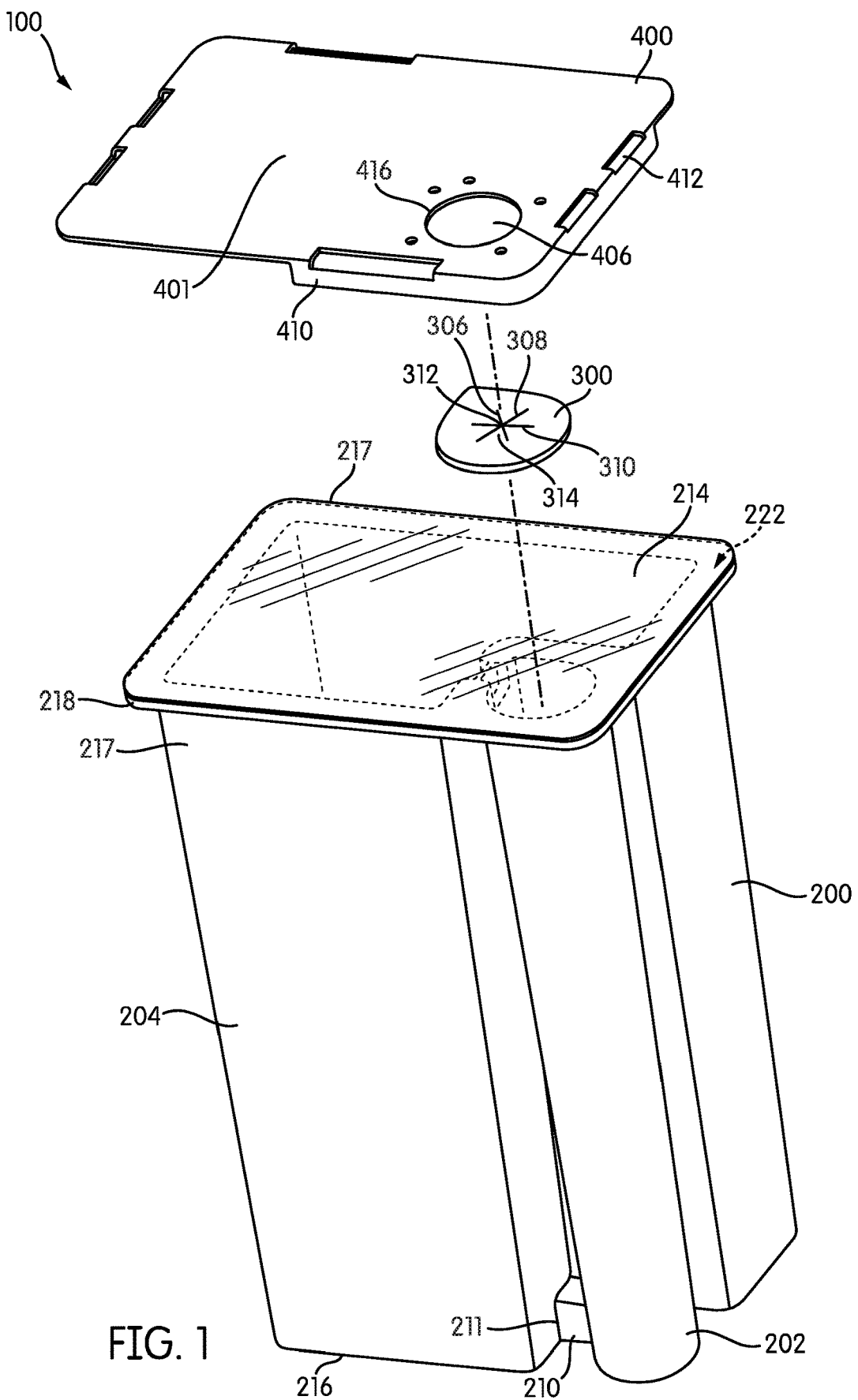
FIG. 1 is an exploded perspective view of a receptacle for minimizing evaporation of a fluid, according to an embodiment.

The present disclosure will now be described in detail with reference to embodiments thereof as illustrated in the accompanying drawings. References to "one embodiment," "an embodiment," "some embodiments," "an exemplary embodiment," "for example," "an example," "exemplary," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, "a" or "an" means "at least one" or "one or more."

As used herein, a "sample" refers to any material to be analyzed, regardless of the source. The material can be in its native form or any stage of processing (e.g., the material can be chemically altered or it can be one or more components of a sample that have been separated and/or purified from one or more other components of the sample). A sample can be obtained from any source, including, but not limited to, an animal, environmental, food, industrial or water source. Animal samples include, but are not limited to, peripheral blood, plasma, serum, bone marrow, urine, bile, mucus, phlegm, saliva, cerebrospinal fluid, stool, biopsy tissue including lymph nodes, respiratory tissue or exudates, gastrointestinal tissue, cervical swab samples, semen or other body or cellular fluids, tissues, or secretions. Samples can be diluted or contained within a receptacle containing diluents, transport media, preservative solution, or other fluids. As such, the term "sample" is intended to encompass samples contained within a diluent, transport media, and/or preservative or other fluid intended to hold a sample.

As used herein, a "sample processing instrument" refers to any instrument capable of performing a processing step on a sample contained within a receptacle. A sample processing instrument includes any instrument capable of performing an assay on a sample and rendering a result. For example, a sample processing instrument includes any instrument capable performing an assay on a sample to determine the presence or amount of an analyte in the sample. Any instrument capable of performing a hybridization assay, a molecular assay including a nucleic-acid-based amplification reaction, a sequencing assay, an immunoassay, or chemical assay on a sample is included in this definition of a sample processing instrument. Exemplary sample processing instruments capable performing an assay on a sample to determine the presence of an analyte in the sample include the Tigris® and Panther® systems sold by Hologic, Inc., Marlborough, Mass., as well as any of the diagnostic instruments disclosed in U.S. Patent Application Publication No. 2016/0060680, published Mar. 3, 2016. A sample processing instrument also includes any instrument that only performs sample preparation steps and is not capable of analyzing a sample and/or rendering a result. For example, an instrument that transfers a sample from one receptacle to another receptacle or adds one substance to a receptacle containing a sample, but does not perform an assay on the sample, is a sample processing instrument. And, for example, an instrument that only performs sample preparation steps to isolate and/or purify an analyte of interest is a sample processing instrument. An exemplary sample processing instrument that only performs sample preparation steps is the Tomcat® system sold by Hologic, Inc., Marlborough, Mass.

Exemplary Receptacles

In some embodiments, a receptacle for containing a fluid may include a receptacle body defining one or more chambers that are configured to contain (and, in some embodiments, actually contain) a fluid, and a septum covering an opening of at least one of the one or more chambers. The septum may eliminate or minimize evaporation of a fluid in a chamber covered by the septum by limiting exposure of the fluid contained within the respective chamber covered by the septum to atmospheric conditions. And in some embodiments, the receptacle may further include one or more seals covering the opening of the one or more chambers, thereby further reducing the evaporation of a fluid from the receptacle.

Figure 2:
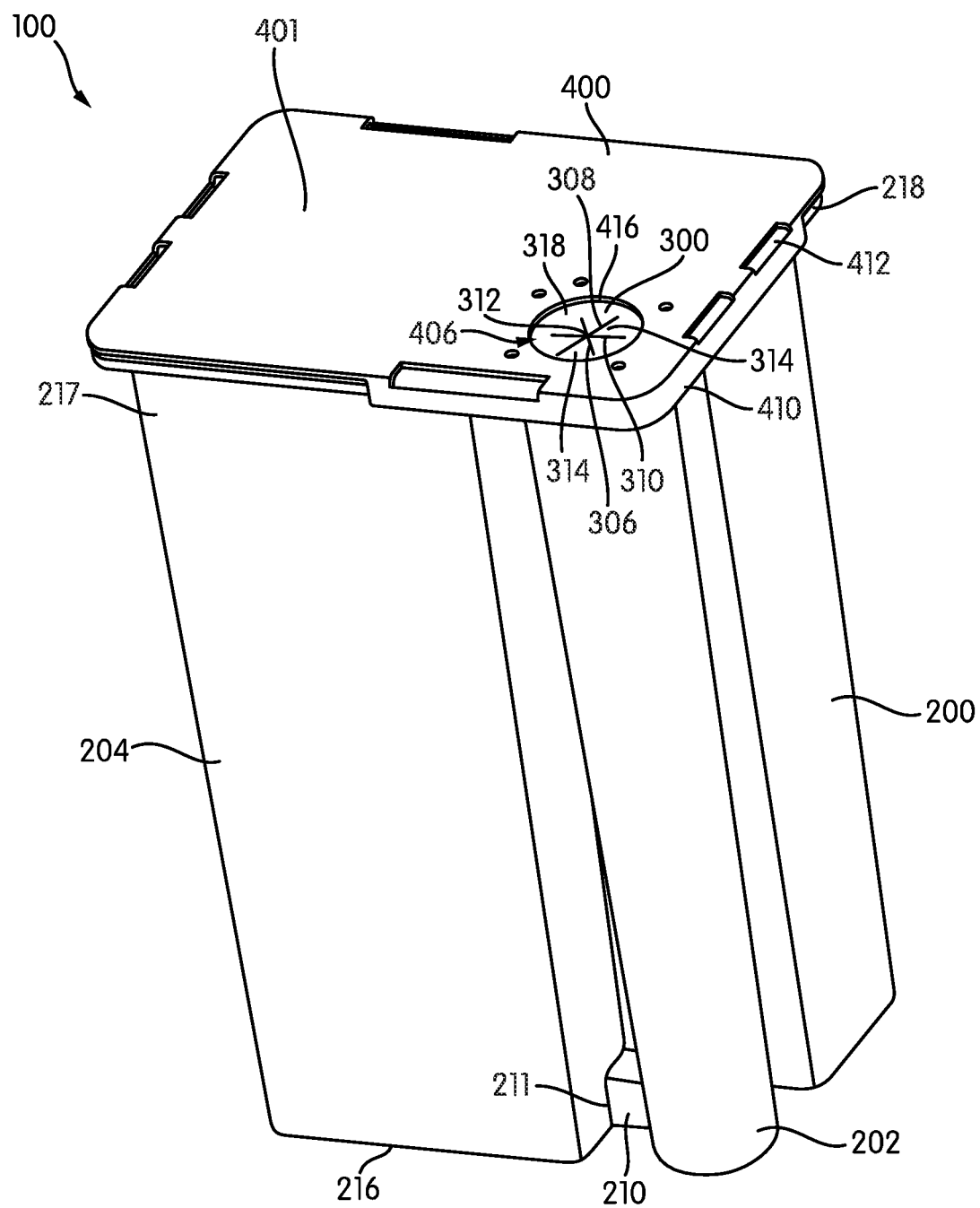
FIG. 2 is a perspective view of a receptacle for minimizing evaporation of a fluid, according to an embodiment.

FIGS. 1 and 2 show an exploded view and an assembled view, respectively, of an exemplary receptacle 100 according to an embodiment. Receptacle 100 may include a body 200 configured to contain a fluid 600, a septum 300 configured to substantially seal an opening of at least one chamber containing fluid 600, and a lid 400 configured to couple (i.e., secure) septum 300 to body 200.

In some embodiments, fluid 600 can be any fluid used by a sample processing instrument. For example, fluid 600 can be any fluid used by an instrument capable of performing an assay on a sample and rendering a result, such as a fluid used by an instrument to determine the presence of an analyte in the sample. In some embodiments, fluid 600 may comprise one or more of the following reagents: target capture reagents for isolating and purifying a target nucleic acid (e.g., reagents containing a solid support, such as magnetically-responsive particles), amplification reagents for use in a nucleic acid amplification reaction (e.g., primers, nucleoside triphosphates, salts, buffers, etc.), detectable probes (e.g., oligomers that fully or partially hybridize to a target sequence under conditions that promote hybridization), solutions for reconstituting dried reagents, elution buffers, oil, and any other reagent used to performing an assay on a sample.

In some embodiments, receptacle 100 is configured to contain an amount of fluid 600 sufficient to perform about 50 to about 2,000 assays. In some embodiments, receptacle 100 contains an amount of fluid 600 for performing less than about 50 assays, or more than about 2,000 assays.

Body 200 may include one or more openings through which fluid 600 may enter or exit one or more chambers of body 200. In some embodiments, body 200 may be configured to interface with sample trays or racks used with or forming part of an automated sample processing instrument. For example, in some embodiments, body 200 can be sized and shaped to be received in a recess defined by a tray or rack that supports body 200. And for example, body 200 can be sized and shaped such that when supported on a tray or rack used with or forming part of an automated sample processing instruments, automated components (e.g., an automated pipettor) can access body 200. In such embodiments, body 200 may contain a fluid used by the automated sample processing instrument.

In some embodiments, body 200 may include a bottom end portion 216 and a top end portion 217. Lid 400 may be located adjacent top end portion 217. Lid 400 may be configured to be releasably coupled to body 200 in some embodiments. The coupling of lid 400 to body 200 is explained further below. In some embodiments, bottom end portion 216 may be configured to support body 200 such that receptacle 100 is self-standing. In the context of this application, self-standing means receptacle 100 can remain upright when bottom end portion 216 is placed on a substantially horizontal surface without the aid of any supporting structures apart from receptacle 100. For example, bottom end portion 216 may have a flat bottom surface, or body 200 can define a supporting skirt that circumscribes all or a portion of the perimeter of body 200 at bottom end portion 216.

Figure 3:
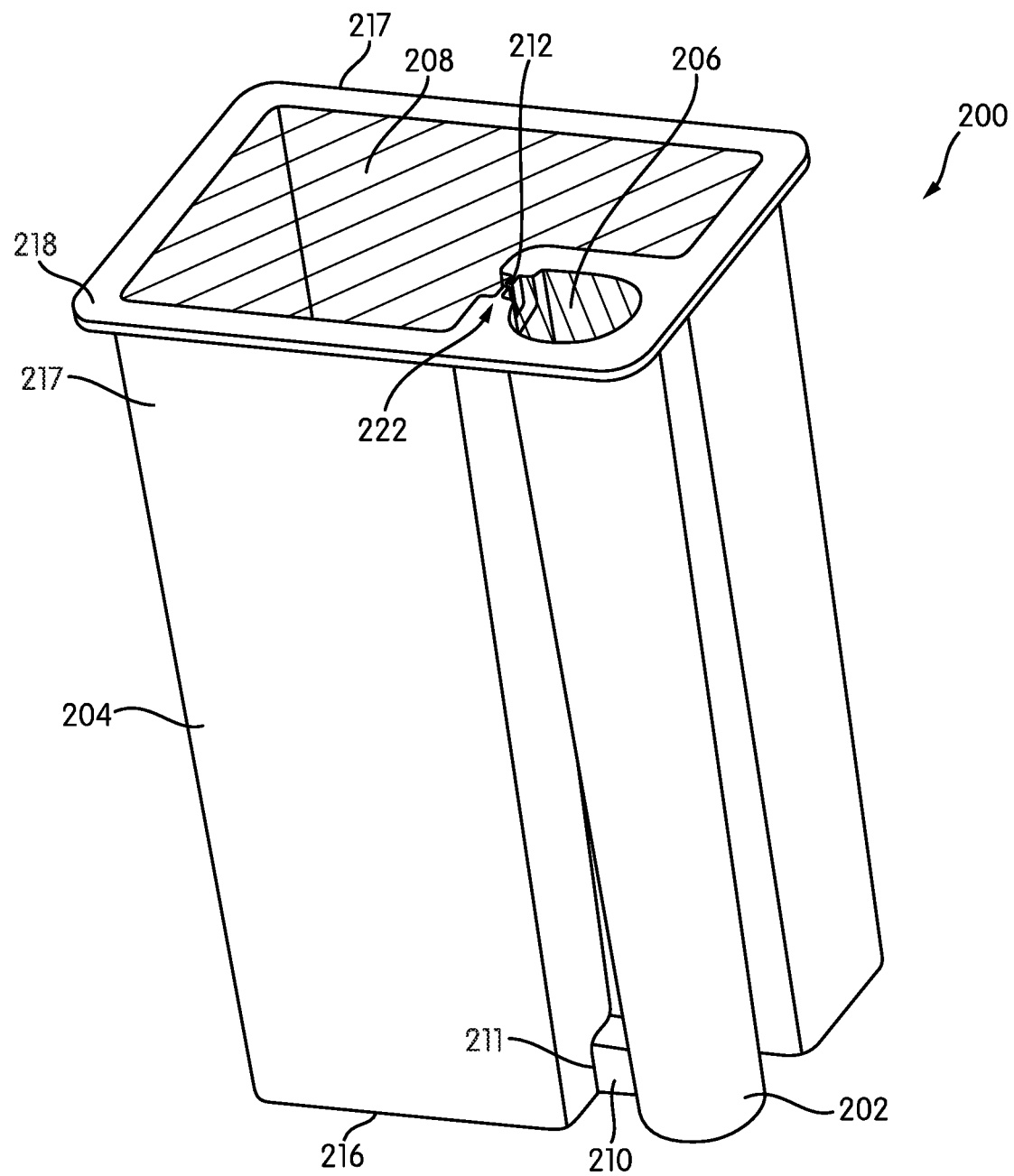
FIG. 3 is a perspective view of a body of a receptacle for minimizing evaporation of a fluid, according to an embodiment.

Body 200 can define one more chambers configured to contain a fluid. For example, as shown in FIG. 3, body 200 may include a first chamber 202 and a second chamber 204. In some embodiments, second chamber 204 has a greater volume than first chamber 202, as shown in FIG. 3. In some embodiments, first chamber 202 has a substantially cylindrical shape as best shown in FIGS. 1 and 3. In other embodiments (not shown), first chamber 202 may have a rectangular prism shape, spherical shape, or any other suitable shape for containing a fluid. In some embodiments, second chamber 204 has a complex shape made of two different sized, substantially rectangular prism portions having a cross-sectional L-shape as shown in FIGS. 1 and 3. In other embodiments (not shown), second chamber 204 has a substantially rectangular prism shape, a spherical shape, a cylindrical shape, or any other suitable shape. In some embodiments, first chamber 202 and second chamber 204 may share boundary walls. For example, a single wall between both first chamber 202 and second chamber 204 can define both a portion of first chamber 202 and a portion of second chamber 204. In some embodiments (as shown in FIGS. 1 and 3), first chamber 202 may be adjacent to second chamber 204 and positioned adjacent the smaller substantially rectangular prism portion of second chamber 204. In such embodiments, this relative positioning of first chamber 202 and second chamber 204 gives body 200, as a whole, a substantially rectangular cross-section.

First chamber 202 may have a first chamber opening 206 that allows fluid 600 to be added to or removed from first chamber 202. First chamber opening 206 is shown with imaginary diagonal lines (slanting downward from left to right in FIG. 3) to represent the area defining first chamber opening 206. First chamber opening 206 is an entrance or portal to first chamber 202 through which fluid may enter or exit. In some embodiments, first chamber opening 206 opening has a shape that corresponds with the cross-sectional shape of first chamber 202. For example, first chamber opening 206 may be substantially circular, corresponding with the circular cross-sectional shape of first chamber 202, as shown in FIG. 3. In some embodiments, first chamber opening 206 may have a rectangular shape or any other suitable shape. In some embodiments, first chamber opening 206 may be defined by an exterior surface 222, for example, a top surface of body 200 as best seen in FIG. 3. In some embodiments, surface 222 defining first chamber opening 206 can be substantially planar as best seen in FIGS. 1 and 3, or surface 222 defining first chamber opening 206 may have a more intricate non-planar geometry.

Second chamber 204 may have a second chamber opening 208 that allows fluid 600 to be added to or removed from second chamber 204. Second chamber opening 208 is shown with imaginary diagonal lines (slanting downward from right to left) to represent the area defining second chamber opening 208 in FIG. 3. Second chamber opening 208 is an entrance or portal to second chamber 204 through which fluid may enter or exit. In some embodiments, second chamber opening 208 has a shape that corresponds with the cross-sectional shape of second chamber 204. For example, second chamber opening 208 may have an L-shape, corresponding to the L-shape of second chamber 204, as shown in FIG. 3. In some embodiments, second chamber opening 208 has a circular, rectangular, or any other suitable shape. In some embodiments, second chamber opening 208 may be defined by the same surface 222 that defines first chamber opening 206. In other embodiments (not shown), second chamber opening 208 is defined by a surface other than surface 222 defining first chamber opening 206. Further, in some embodiments (as shown in FIG. 3), second chamber opening 208 and first chamber opening 206 are co-planar—located on the same plane. In some embodiments, surface 222 defining second chamber opening 208 is substantially planar as shown in FIGS. 1 and 3, or surface 222 defining second chamber opening 208 may have a more intricate non-planar geometry.

In some embodiments, at least one, if not both, of first chamber opening 206 and the cross-sectional shape (along a horizontal plane) of first chamber 202 is smaller than second chamber opening 208 and the cross-sectional shape (along a horizontal plane) of second chamber 204, respectively, as shown in FIGS. 1 and 3. Reducing the size of first chamber opening 206 may reduce the flow rate of air into first chamber 202, thereby reducing the evaporation rate. And reducing the cross-sectional shape of first chamber 202 may reduce the surface area of a fluid exposed to the atmosphere in first chamber 202, thereby reducing the evaporation rate.

In some embodiments, second chamber opening 208 is permanently sealed.

In some embodiments, body 200 includes a fluid conduit 210 that fluidly connects first chamber 202 and second chamber 204. Fluid conduit 210 may equalize the fluid level in first chamber 202 and second chamber 204. As fluid is removed from first chamber 202, fluid flows from second chamber 204 through fluid conduit 210 and into first chamber 202, which results in substantially the same fluid level in both first and second chambers 202 and 204.

In some embodiments, conduit 210 can be a channel, for example, a channel extending between first chamber 202 and second chamber 204 over a non-negligible length. In some embodiments, conduit 210 can be an opening having a negligible length—for example, simply the thickness of a thin wall defining such an opening and separating first chamber 202 from second chamber 204.

Figure 10:
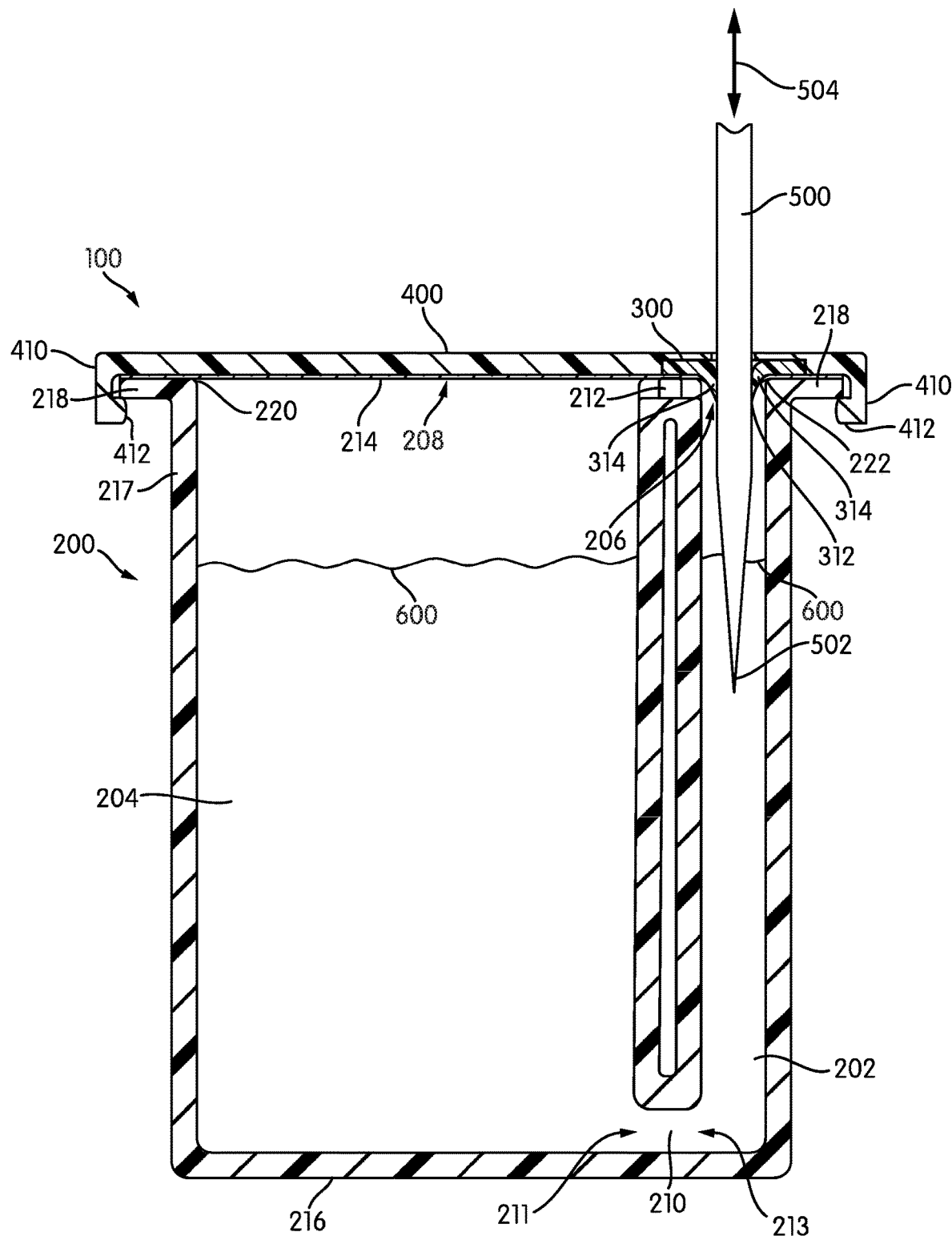
FIG. 10 is a cross-sectional view of a receptacle for minimizing evaporation of a fluid, according to an embodiment taken along line 10-10 in FIG. 6.
Figure 11:
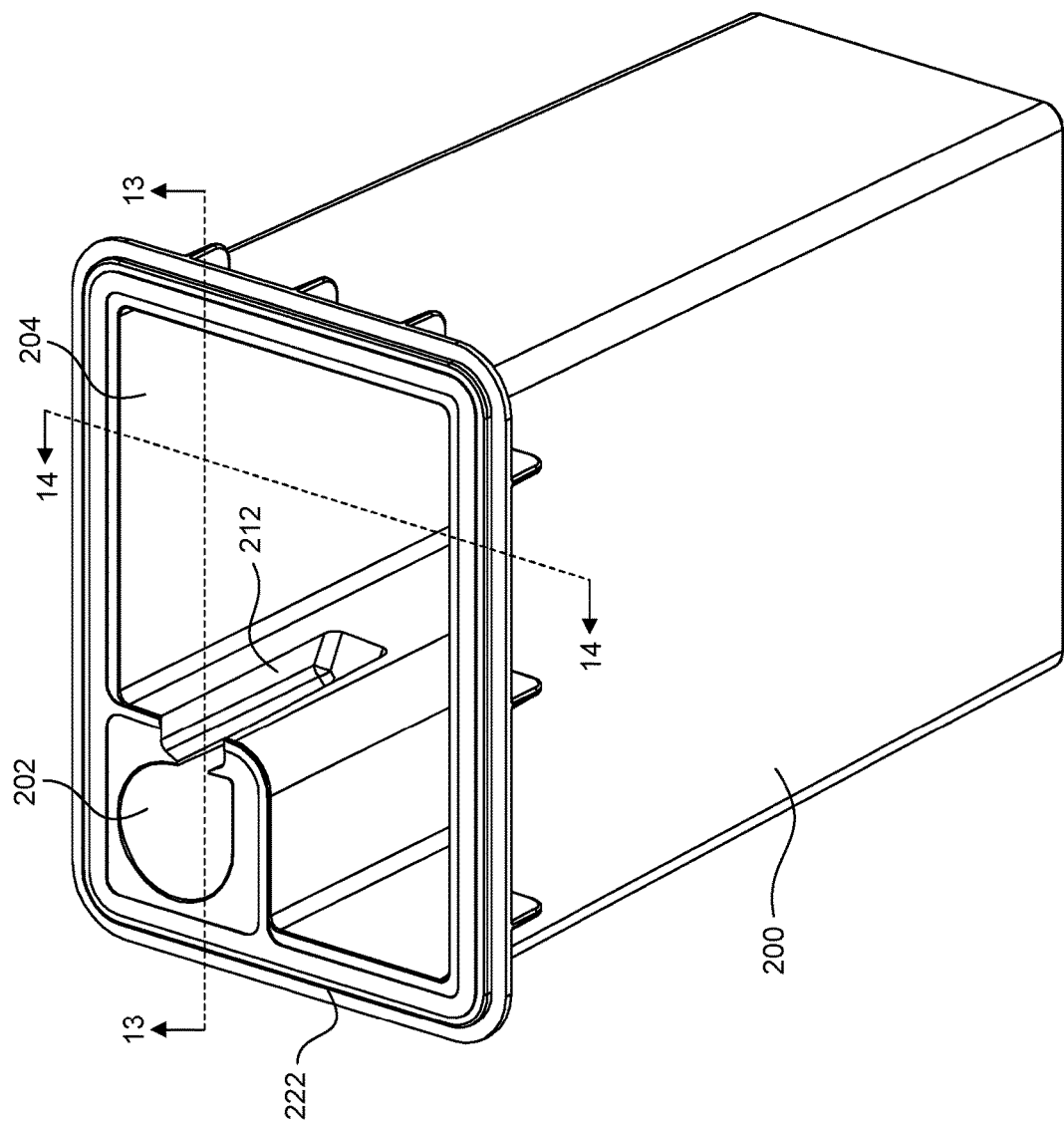
FIG. 11 is a perspective view of a body of a receptacle, according to an embodiment.

In some embodiments (as shown in FIG. 3), fluid conduit 210 has a substantially square or rectangular cross-section and a substantially square or rectangular profile when viewed from the side. In some embodiment, fluid conduit 210 has a first fluid channel opening 211 and a second fluid channel opening 213, as shown in FIG. 10. First fluid channel end and second fluid channel end may define openings in first chamber 202 and second chamber 204, respectively. In some embodiments, first fluid channel end and second fluid channel end are the same shape, or in some embodiments, first fluid channel end and second fluid channel end may be different shapes. In some embodiments, first fluid channel end and second fluid channel end lie in substantially the same horizontal plane such that fluid conduit 210 extends laterally from the first chamber 202 to the second chamber 204. Fluid conduit 210 may be located at end portion 216 of body 200, adjacent the bottom chamber-defining surfaces of first chamber 202 and second chamber 204, in some embodiments. For example, in some embodiments, conduit 210 is position slightly above the bottom chamber-defining surfaces of first chamber 202 and second chamber 204.

As shown in FIG. 3, body 200 may also include a second fluid conduit 212 that fluidly connects first chamber 202 and second chamber 204. Second conduit 212 can be configured to prevent a vacuum from forming in the void between fluid 600 contained in second chamber 204 and a seal 214 (which is discussed further below) covering second chamber opening 208. Second conduit 212 can positioned at top end portion 217 of body 200, adjacent surface 222. Second conduit 212 is positioned above the initial fluid level—the level of the fluid before any fluid is removed from receptacle 100, in some embodiments.

In some embodiments, conduit 212 can be a channel, for example, a channel extending between first chamber 202 and second chamber 204 over an extended length (e.g., a range from about 1.5 mm to about 5.0 mm).

In some embodiments, conduit 212 can be an opening having a negligible length—for example, simply the thickness (e.g., less than about 1.0 mm) of a thin wall defining such an opening and separating first chamber 202 from second chamber 204. For example, conduit 212 can be a narrow, rectangular recessed slit defined in surface 222 and the wall between first chamber 202 and second chamber 204, as shown in FIG. 3. The dimension of the slit (in a vertical plane) can be, for example, about 0.5-0.8 mm by about 2.5-3.5 mm. The cross-sectional area (in a vertical plane) of conduit 212, regardless of whether conduit 212 is an opening or a channel, is at least about 1.0 mm$^2$ in some embodiments. For example, the cross-sectional area can range from be about 1.3 mm$^2$ to about 3.0 mm$^2$ in some embodiments.

Figure 12:
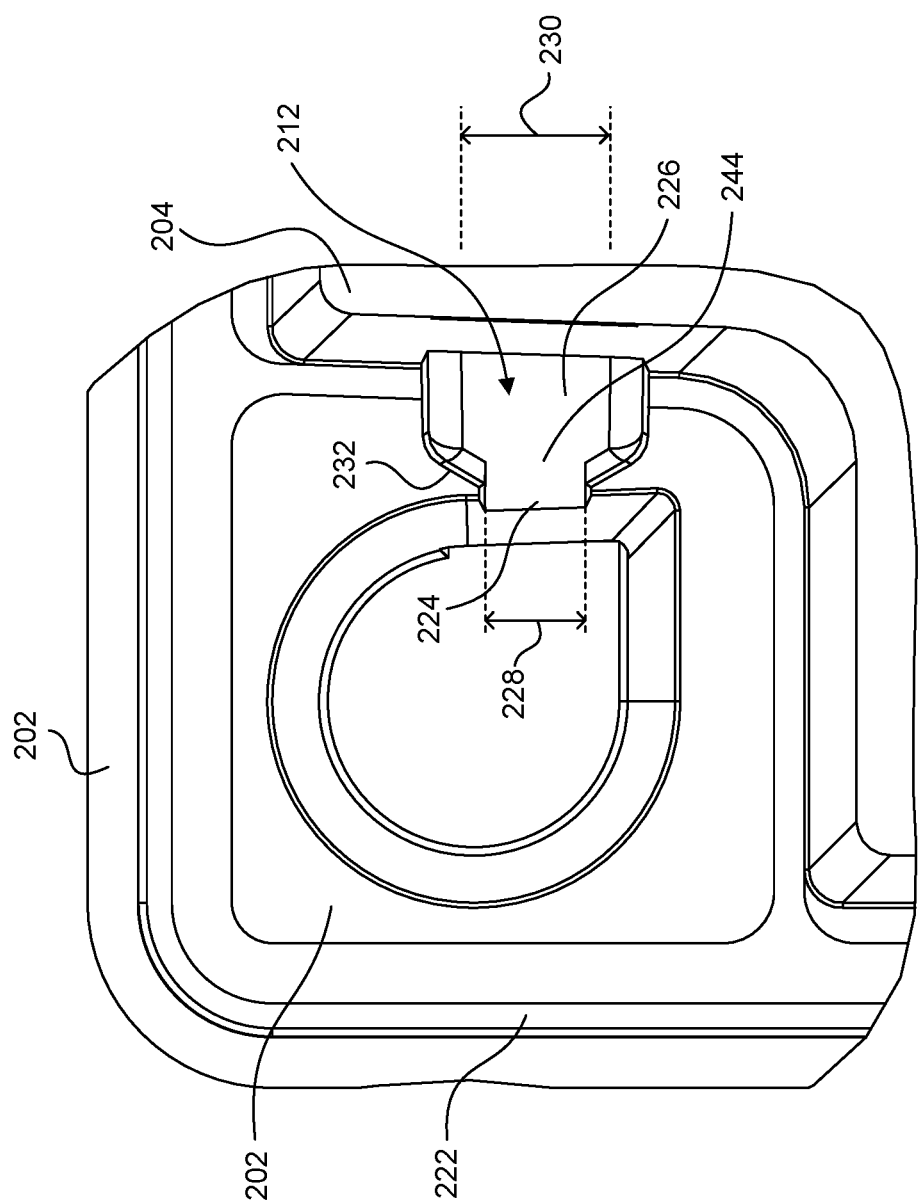
FIG. 12 is a partial plan view of the body of the receptacle in FIG. 11, according to an embodiment.
Figure 13:
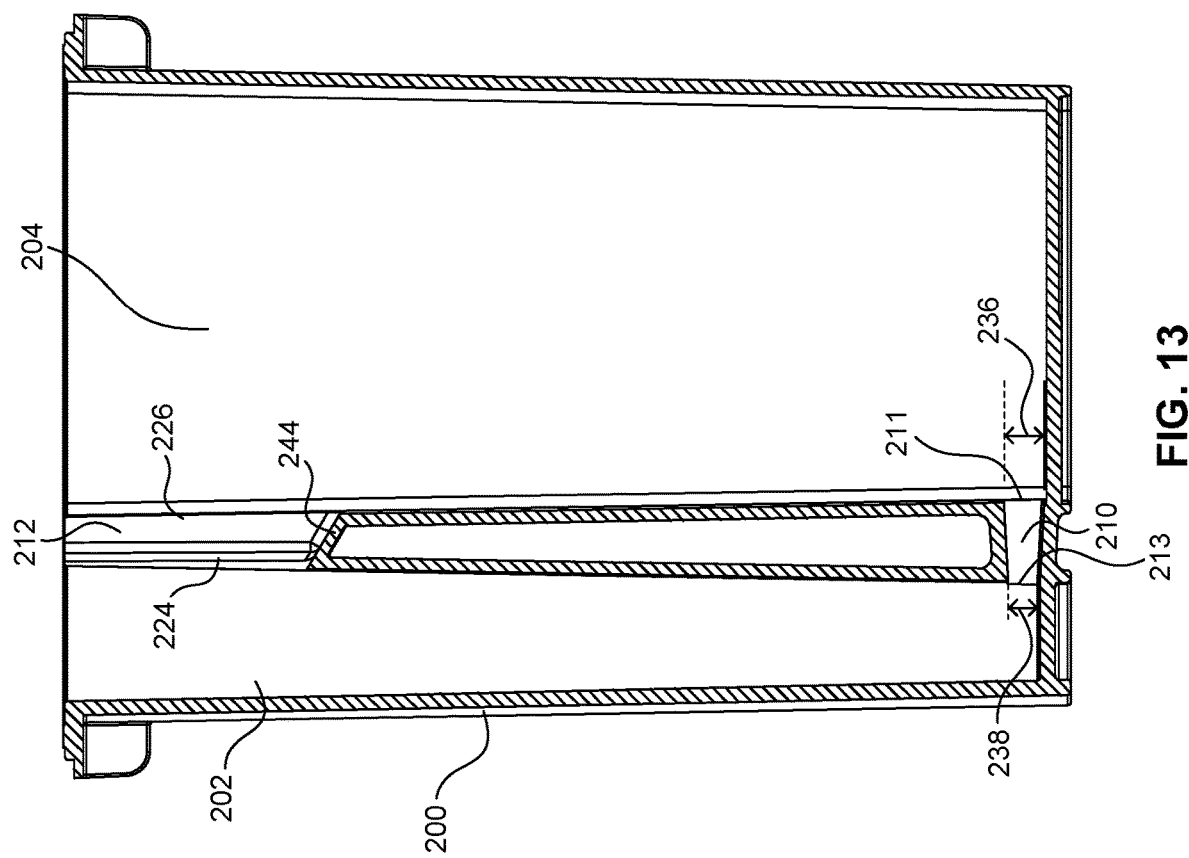
FIG. 13 is a cross-sectional view of the body of the receptacle in FIG. 11 taken along line 13-13 in FIG. 11.
Figure 14:
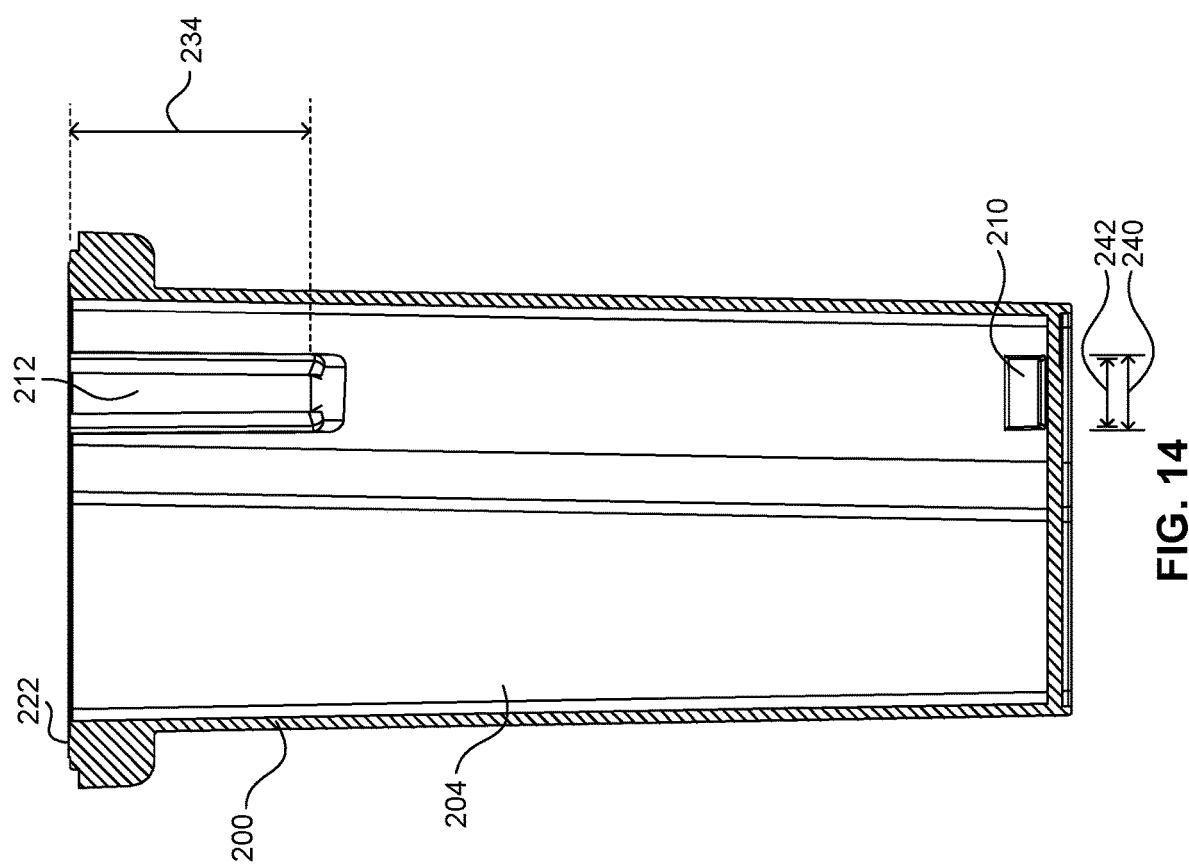
FIG. 14 is a cross-sectional view of the body of the receptacle in FIG. 11 taken along line 14-14 in FIG. 11.

FIGS. 11-14 illustrate exemplary first conduit 210 and second conduit 212, according to another embodiment. As best seen in FIG. 12, second conduit 212 can include a first conduit portion 224 that opens to first chamber 202, and a second conduit portion 226 that opens to second chamber 204. As shown in FIG. 12, a width dimension 228 (in the horizontal plane) of first conduit portion 224 can be smaller than a width dimension 230 (in the horizontal plane) of second conduit portion 226. Second conduit 212 can also include a tapered conduit portion 232 between first and second conduit portions 224 and 226. The width dimension of tapered conduit portion 232 varies from width dimension 228 of first conduit portion 224 to width dimension 230 of second conduit portion 226. In some embodiments, a surface 244 defining the bottom surfaces of first conduit portion 224, tapered conduit portion 232, and second conduit portion 226 slants downward as surface 244 extends from first conduit portion 224 to second conduit portion 226. In some embodiments, the angle between surface 244 and an intersecting horizontal line is in a range between about 20 degrees and 40 degrees, for example, about 30 degrees. Accordingly, in some embodiments, a height dimension 234 (shown in FIG. 14) of first conduit portion 224 can be smaller than a height dimension of second conduit portion 226.

In some embodiments, width dimension 228 (shown in FIG. 12) is in a range from about 2.5 mm to about 4 mm. For example, width dimension 228 can be about 3.3 mm. In some embodiments, width dimension 230 (shown in FIG. 12) is in a range from about 6.0 mm to about 7.5 mm. For example, width dimension 230 can be about 6.8 mm. In some embodiments, height dimension 234 is in the range from about 16.0 mm to about 24 mm. For example, height dimension 234 can be about 20.0 mm. Accordingly, the smallest cross-sectional area (in a vertical plane) of second conduit 212 is in the range from about 40.0 $mm^2$ to about 96.0 $mm^2$ in some embodiments. For example, the cross-sectional area can be about 66.0 $mm^2$.

In some embodiments, opening 211 of conduit 210 (adjacent second chamber 204) can have a width dimension 240 in the horizontal plane (shown in FIG. 14) in a range from about 5.5 mm to about 6.5 mm. For example, width dimension 240 of opening 211 can be about 6.1 mm. Opening 211 of conduit 210 can have a height dimension 236 in the vertical plane (shown in FIG. 13) in a range from about 3.0 mm to about 4.0 mm. For example, the height dimension of opening 211 of conduit 210 can be about 3.3 mm. Opening 213 of conduit 210 (adjacent first chamber 202) can have a width dimension 242 in the horizontal plane (shown in FIG. 14) in a range from about 5.0 mm to about 6.0 mm. For example, width dimension 242 of opening 213 can be about 5.6 mm. Opening 213 of conduit 210 can have a height dimension 238 in the vertical plane (shown in FIG. 13) in a range from about 2.2 mm to about 3.3 mm. For example, the height dimension of opening 213 of conduit 210 can be about 2.7 mm.

In other embodiments, the dimensions of opening 211 and opening 213 of conduit 210 can be the same.

In some embodiments (not shown), conduit 212 may be circular, semi-circular, or other suitable shape. In some embodiments, conduit 212 may have a first fluid channel end and a second fluid channel end. In some embodiments, the first fluid channel end and the second fluid channel end of conduit 212 may have the same shape or different shapes. First fluid channel end and second fluid channel end of conduit 212 open to first chamber 202 and second chamber 204, respectively. Conduit 212 allows the air pressure above a fluid contained in first chamber 202 and second chamber 204 to equalize, thereby preventing a vacuum from forming in the void between the fluid contained in second chamber 204 and the seal covering second chamber opening 208. Accordingly, fluid can flow freely from second chamber 204 through fluid conduit 210 and into first chamber 202, as fluid is removed from first chamber 202, and thereby helps ensure that the fluid levels in first chamber 202 and second chamber 204 are substantially the same. Conduit 212 reduces the likelihood that a vacuum is formed in second chamber 204 and that the pressure is not equalized between first chamber 202 and second chamber 204.

In some embodiments, fluid may be added to second chamber 204 through second chamber opening 208. Second chamber opening 208 may be larger than first chamber opening 206 and, thus, allow for more rapid filling of chambers 202 and 204. As second chamber 204 is filled through second chamber opening 208, fluid may flow into first chamber 202 via fluid conduit 210.

In some embodiments, receptacle 100 also includes one or more fluid-tight seals that hermetically seals the chambers defined by body 200. For example, in some embodiments, receptacle 100 includes a single seal 214 that creates a fluid tight seal for both first chamber 202 and second chamber 204. Seal 214 prevents fluid from leaking from first and second chambers 202 and 204 after being filled but before use (for example, before penetration of seal 214 with a fluid retrieval device of an automated sample processing instrument). Seal 214 can be affixed to body 200 in any suitable way that creates a hermetic seal. For example, seal 214 can be affixed to body 200 by adhesion, ultrasonic welding, or heat welding.

In other embodiments (not shown), receptacle 100 includes two separate seals that respectively create a fluid tight seal of respective first chamber 202 and second chamber 204. For example, a non-frangible (i.e., not readily or not easily broken or pierced) seal may seal second chamber opening 208, while a more easily breakable, frangible seal may seal first chamber opening 206.

Seal 214 may be coupled to (e.g., affixed to) surface 222 of body 200 and may cover first and second chamber openings 206 and 208. In some embodiments, seal 214 may be affixed to surface 222 such that seal 214 directly contacts surface 222. For example, seal 214 can be affixed to surface 222 using an adhesive layer (e.g., a pressure-sensitive adhesive) disposed between seal 214 and surface 222.

In some embodiments, at least a portion of seal 214 is frangible (i.e., readily or easily broken or pierced, for example, by a fluid retrieval device such as a pipette tip or probe). In some embodiments, seal 214 is made of a frangible material having physical properties such that when pierced, for example, by a pipette tip, the material tears or otherwise forms a gap between piercing object and seal 214. These tears can prevent a hermetic seal from forming between the pipette tip and seal 214 when penetrated. Preventing such a hermetic seal from forming helps prevent a vacuum from being formed in first chamber 202 as fluid is aspirated. In some embodiments, seal 214 comprises a metallic foil or any other suitable frangible material that is configured to be pierced by, for example, a pipette tip coupled to an automated pipettor or an integrally formed probe of an automated pipettor. Although seal 214 is illustrated as a single layer in FIG. 10 for illustrative purposes, seal 214 may be formed by more than one layer in some embodiments. In some embodiments, the layers of seal 214 may be the same or different materials. For example, seal 214 can be made of a first, upper protective lacquer layer (e.g., made of acrylic resins), a second, intermediate layer made of a soft metal (e.g., an aluminum alloy or any other moisture resistant metal alloy), and third, lower adhesive layer (e.g., an extrusion polypropylene coating) that bonds seal 214 to body 200. Or for example, seal 214 can be made of a layer of a plastic film, for example, a cyclic olefin copolymer film.

In some embodiments, seal 214 is about 85 µm thick.

In some embodiments, seal 214 is affixed to body 200, and not to lid 400. In such embodiments, if lid 400 is decoupled from body 200 and removed from the receptacle assembly, seal 214 would still cover one or more chambers defined by body 200.

Figure 4:
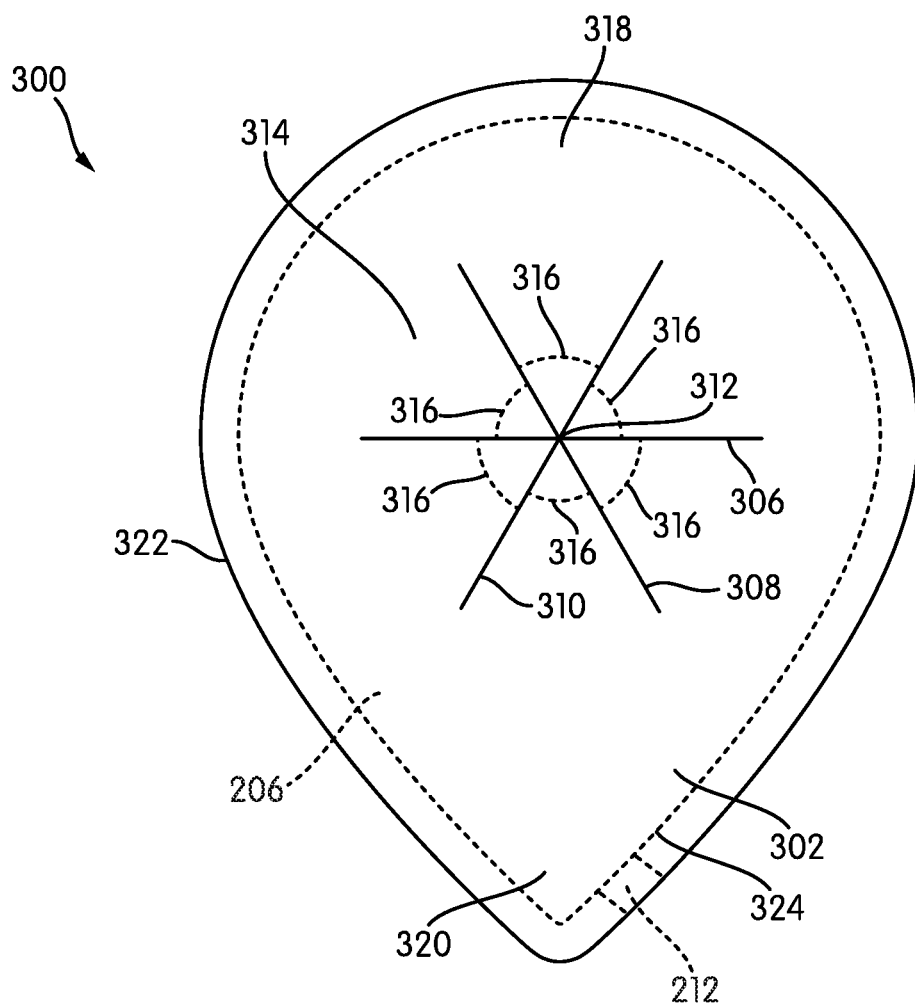
FIG. 4 is a plan view of a septum, according to an embodiment.

Receptacle 100 may also include septum 300 in some embodiments. FIG. 4 shows septum 300 according to an embodiment. Septum 300 may reduce the evaporation of fluid 600 contained in first chamber 202. Septum 300 may act as a boundary between fluid 600 and the ambient atmosphere surrounding body 200.

Septum 300 may be penetrable (i.e., configured to allow a fluid retrieval device 502 (e.g., a removable pipette tip or an integral probe) coupled to or an integral component of a fluid transfer mechanism 500 (e.g., an automated pipettor) to pass there through). Septum 300 may be made of any suitable penetrable material.

In some embodiments, septum 300 is initially (e.g., when shipped from the manufacturer and before performing any assays) solid. In some initially solid embodiments, septum 300 is partially scored (i.e., not all the way through septum 300) with one or more lines to make septum 300 more easily penetrable by fluid retrieval device 502. For example, the initial scored lines can correspond with the slits that form flaps (discussed further below) in septum 300.

In other embodiments, septum 300 may initially (e.g., when shipped from the manufacturer and before performing any assays) include slits extending through the entire thickness of septum 300, and these initial slits can form flaps (discussed further below) in septum 300.

Septum 300 may be configured to seal first chamber opening 206 in some embodiments. For example, septum 300 may seal first chamber opening 206 after seal 214 is broken or pierced. By sealing first chamber opening 206, septum 300 limits the amount of exposure fluid 600 contained within first chamber 202 has with ambient conditions, thereby eliminating or reducing evaporation of fluid 600 from first chamber 202. For example, in some embodiments, fluid 600 contained in first chamber 202 may be a fluid used by a sample processing instrument, and may include a solvent, a solute, or both. In some embodiments, the concentration of the solute dissolved in the solvent may need to be precisely controlled—the ratio of solute to solvent remains substantially unchanged. If the mixture of the solvent and solute is exposed to ambient conditions, a portion of the solvent may evaporate, thereby decreasing the amount of solvent in the solution and increasing the ratio of solute to solvent. By sealing first chamber opening 206 of first chamber 202, septum 300 may limit exposure of the solute-solvent mixture to the ambient environment, thereby reducing or eliminating the amount of evaporation of solvent.

In some embodiments, septum 300 has a shape and size sufficient to cover the entire first chamber opening 206 of first chamber 202. For example, as shown in FIG. 4, septum 300 can have a tear-drop shape when viewed in plan. The tear-drop shaped septum 300 includes a substantially circular first portion 318 and a substantially triangular second portion 320.

In some embodiments, septum 300 covers only first chamber opening 206 of first chamber 202 and does not cover any portion of second chamber opening 208 of second chamber 204. For example, if fluid is only aspirated through first chamber opening 206 (and not through second chamber opening 208), septum 300 may cover only first chamber opening 206 through which fluid is aspirated.

In some embodiments, a portion of septum 300 also covers second chamber opening 208 of second chamber 204.

Figure 5:
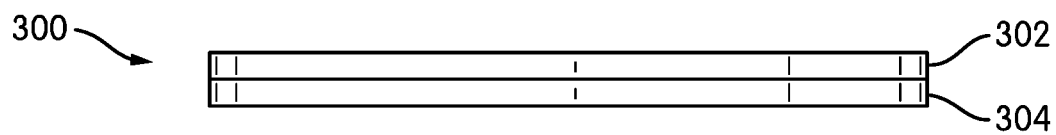
FIG. 5 is a side view of a septum, according to an embodiment.

Septum 300 may be made of one or more suitable resilient materials such that, when a force is applied to flaps formed therein, the flaps deform and, when the force is removed, the flaps return substantially to their original orientation. In some embodiments, septum 300 may include one or more layers when viewed from the side. For example, as shown in FIG. 5, septum 300 may include a first layer 302 and a second layer 304. In some embodiments, first layer 302 and second layer 304 may be made of different materials. The compositions of first layer 302 and second layer 304 may be adjusted to achieve desired properties depending on use. In some embodiments, first layer 302 is made of a material configured to reduce the friction between septum 300 and a fluid retrieval device 502 of fluid transfer mechanism 500 when fluid retrieval device 502 passes through septum 300 into first chamber 202. For example, if septum 300 is to be penetrated by fluid retrieval device 502, first layer 302, may be made of a material to reduce the friction between fluid retrieval device 502 and septum 300. For example, first layer 302 may comprise polytetrafluoroethylene in some embodiments.

In some embodiments, second layer 304 is made of a resilient material (e.g., silicone or any other suitable resilient material) that drives flaps formed in septum 300 back to their original orientation when a force is removed from the flaps. In some embodiments, second layer 304 may be made of a higher (relative to first layer 302) friction product. For example, the higher friction product can increase the adhesive force between second layer 304 and surface 222 or seal 214 (discussed below). In this way, septum 300 may be less likely to become dislodged during use. For example, second layer 304 may comprise silicone in some embodiments.

In some embodiments, septum 300 may have one or more slits (for example, three slits 306, 308, and 310 shown in FIG. 4) that that form a plurality of flaps (for example, six flaps 314 in FIG. 4). As shown in FIG. 4, slits 306, 308, and 310 may be formed entirely within an interior of peripheral edge 322 of septum 300. In some embodiments, slits 306, 308, and 310 may be preformed such that they pass entirely, so that flaps 314 are loose and can move relative to each other in an initial state. In other embodiments, slits 306, 308, and 310 are preformed such that they only partially (i.e., not entirely through septum 300, for example, by scoring) extend through the thickness of septum 300 in an initial state. In some embodiments, slits 306, 308, and 310 may generally intersect at a point 312, for example, the center of circular portion 318. In some embodiments, first, second, and third slits 306, 308, 310 may bisect one another. Although the illustrated embodiment in FIG. 4, includes three slits 306, 308, and 310, septum 300 can include one, two, four, five, or more than five slits in other embodiments.

First, second, and third slits 306, 308, 310 form an angle 316 between adjacent slits. In some embodiments, angles 316 may be about equal, for example, about 60 degrees as shown in FIG. 4. In other embodiments, one or more of angles 316 are not equal.

First, second, and third slits 306, 308, and 310 form six corresponding flaps 314. In some embodiments, flaps 314 may be biased to a configuration that seals first chamber opening 206, for example, to a configuration at which flaps 314 are substantially parallel with surface 222 supporting septum 300. Flaps 314 may be resilient such that, as fluid retrieval device 502 of fluid transfer mechanism 500 contacts flaps 314, flaps 314 flex, thereby allowing fluid retrieval device 502 to pass into first chamber 202, and flaps 314 substantially return to their biased configuration, such that first chamber opening 206 is sealed when fluid retrieval device 502 is removed.

In embodiments in which there are more or less than three slits, more or less than three flaps 314 are formed. For example, four bisecting slits would form eight flaps 314, and two bisecting slits would form four flaps 314. Or for example, one slit would form two flaps 314.

Illustrated dashed line 324 in FIG. 4 generally represents the underlying edge of surface 222 defining first chamber opening 206 of first chamber 202 and conduit 212 when septum 300 is aligned with and covers first chamber opening 206, according to an embodiment. Body 200 (e.g., underlying portions of surface 222) may support areas of septum 300 outside of line 324. And in some embodiments (as shown in FIG. 4), slits 306, 308, and 310 may be formed entirely within line 324, such that flaps 314 are entirely interior to line 324. In other embodiments (not shown), terminal outer portions of slits 306, 308, and 310 may be formed outside of line 324, such that flaps 314 extend outside of line 324.

Figure 6:
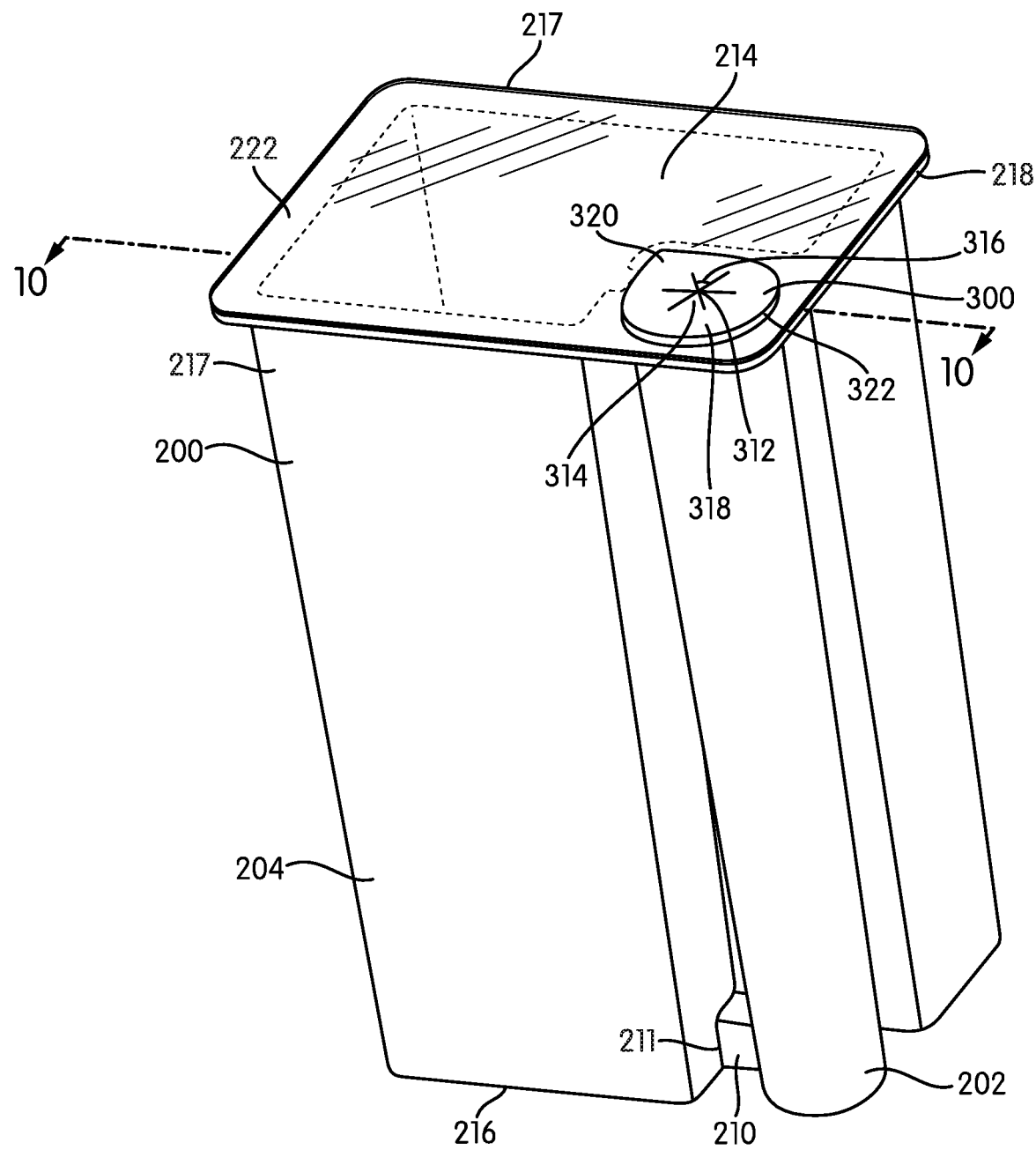
FIG. 6 is a perspective view of a body and septum of a receptacle for minimizing evaporation of a fluid, according to an embodiment.
Figure 7:
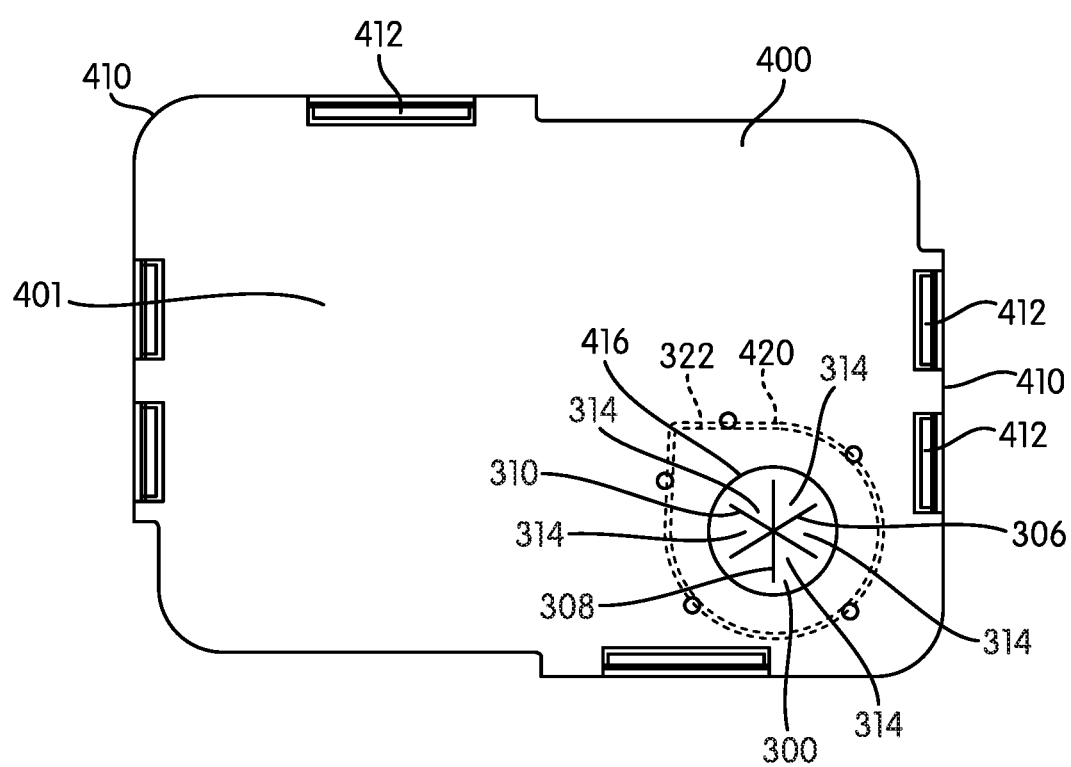
FIG. 7 is a top view of a lid of a receptacle for minimizing evaporation of a fluid, according to an embodiment.

FIG. 6 illustrates septum 300 shown on body 200 with lid 400 omitted for illustrative purposes. Septum 300 overlaps (partially or entirely) in a vertical direction at least the portion of seal 214 covering first chamber opening 206 of first chamber 202. As such, septum 300 covers first chamber opening 206 of first chamber 202. As shown in FIG. 6, septum 300 may contact seal 214 in some embodiments. In some embodiments, point 312 (at which slits 306, 308, and 310 intersect) of septum 300 is substantially aligned with a center longitudinal axis of first chamber 202. When viewed in plan as shown in FIG. 7, flaps 314 may be disposed entirely interior of periphery 416 of first chamber opening 206 in some embodiments, and may have portions which rest above portions of body surface 222.

FIGS. 1, 2, and 7-9 illustrate lid 400 that couples septum 300 to body 200 according to an embodiment. In some embodiments, lid 400 secures septum 300 to body 200 such that movement of septum 300 relative to body 200 is substantially prevented. In the illustrated embodiment, lid 400 positions septum 300 such that septum 300 contacts seal 214, which is disposed on body 200. As best seen in FIGS. 1 and 2, septum 300 is disposed between at least a portion of lid 400 (e.g., the portion adjacent periphery 416 defining opening 406) and seal 214 on body 200.

In some embodiments, lid 400 is configured to be releasably coupled to body 200. In some embodiments, lid 400 may be configured for a friction fit or an interference fit, such as a snap-fit connection, with body 200.

In some embodiments, lid 400 may be configured for a substantially permanent coupling to body 200, for example, via an adhesive connection, a permanent interference fit, ultrasonic welding, or thermoplastic staking (also known as heat staking).

In some embodiments, lid 400 is not a screw cap. That is, lid 400 does not include threads that correspond to threads on body 200 for threaded engagement there between.

Figure 8:
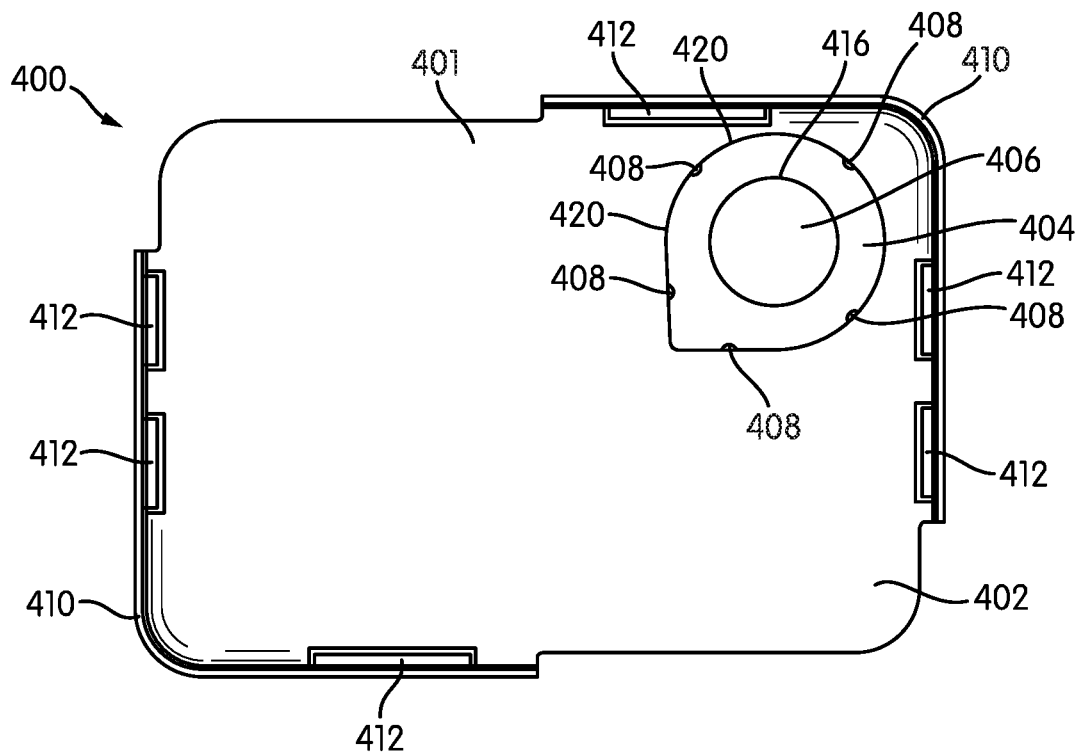
FIG. 8 is a bottom view of a lid of a receptacle for minimizing evaporation of a fluid, according to an embodiment.

Lid 400 may have a lid cover 401 and at least one lid flange 410 extending from the periphery of lid cover 401 in a direction toward body 200 in some embodiments. Lid flange 410 may help ensure proper registration between lid 400 and body 200 and include components for releasably coupling lid 400 to body 200. For example, FIG. 8 illustrates a bottom surface 402 of lid 400 that faces body 200 when lid 400 is coupled to body 200. Lid 400 may include snap fit connectors 412 disposed on lid flange 410 extending from bottom surface 402 in a direction generally perpendicular to bottom surface 402 and towards body 200. Snap fit connectors 412 extend inwardly from flange 410. Snap fit connectors 412 are configured to mate with corresponding one or more snap-fit components on body 200 (e.g., an outwardly extending flange 218 formed at top end portion 217 of body 200, or a correspondingly shaped recess) to generate a snap fit, thereby coupling lid 400 to body 200. Once coupled, movement of lid 400 relative to body 200 is substantially prevented.

Figure 9:
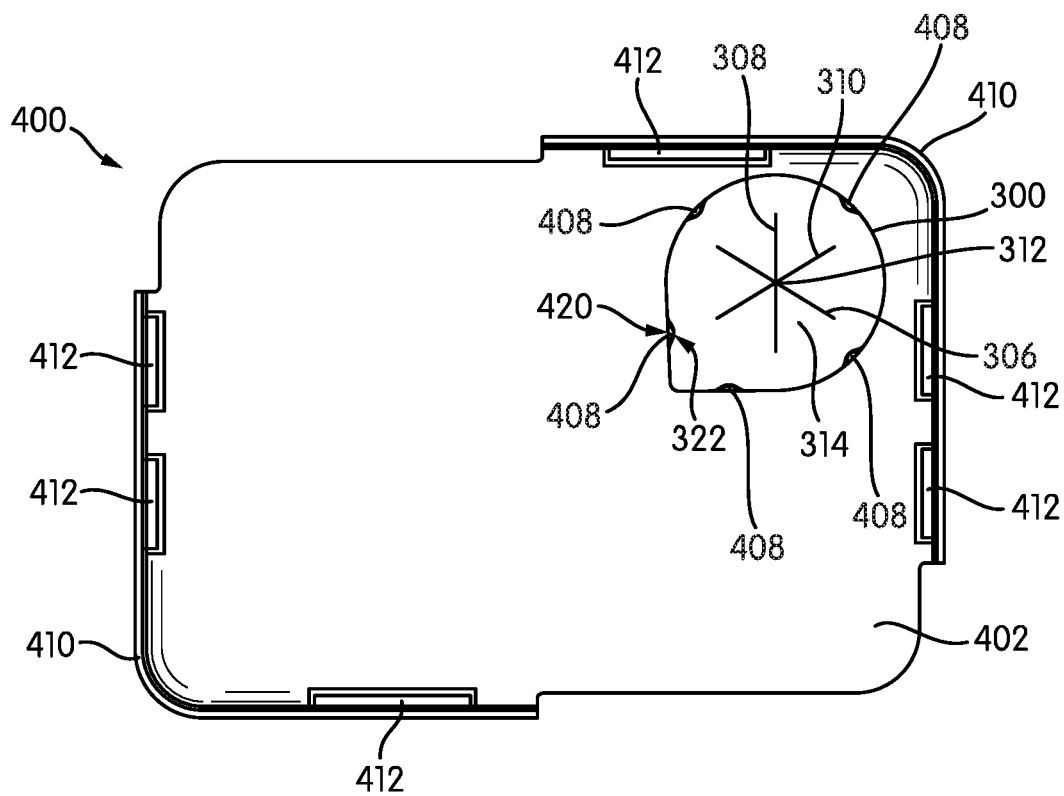
FIG. 9 is a bottom view of a lid and septum of a receptacle for minimizing evaporation of a fluid, according to an embodiment.

In some embodiments, bottom surface 402 of lid cover 401 defines a lid recess 404, as best seen in FIG. 8. Lid recess 404 is configured to receive septum 300 as shown in FIG. 9. Lid recess 404 may be a variety of shapes configured to mate with septum 300. Accordingly, lid recess 404 can have a shape that corresponds to the shape of septum 300. For example, as best seen in FIG. 8, recess 404 may have a tear-drop shape that corresponds to the tear-drop shape of septum 300 in some embodiments. In some embodiments, lid recess 404 may have a depth that, in some embodiments, is greater than or equal to the thickness of septum 300. In other embodiments, the depth of lid recess 404 is less than the thickness of septum 300.

In some embodiments, cover 401 may define an opening 406 that is aligned with recess 404. The periphery 416 of opening 406 may be one of a variety of shapes. As shown in FIG. 8, for example, opening 406 may be circular and sized to allow a fluid retrieval device 502 (a pipette tip in the illustrated embodiment of FIG. 10) to pass. In some embodiments, opening 406 is sized only slightly larger than fluid retrieval device 502 (e.g., the diameter of opening 406 is only slightly larger than the diameter of fluid retrieval device 502) to reduce the exposed surface area of first chamber 202 which may be disposed beneath opening 406, and/or to reduce the air flow into first chamber 202 through first chamber opening 206.

Lid 400 may also include one or more protrusions 408 extending from periphery 420 into lid recess 404. Protrusions 408 are configured to retain septum 300 within recess 404. For example, protrusions 408 may increase the friction or create a snap-fit between septum 300 disposed in lid recess 404, and lid 400, thereby coupling septum 300 to lid 400 such that septum 300 moves with lid 400. As shown in FIG. 9, septum 300 rests in lid recess 404 and is held in place by protrusions 408 extending into lid recess 404 and, thereby, engaging septum 300.

In some embodiments, recess 404 and opening 406 are configured (shaped and positioned relative to each other) such that point 312 (the point at which slits 306, 308, 310 intersect) is aligned (when viewed in plan) with the center of opening 406. As shown in FIGS. 2 and 7, flaps 314 may be formed entirely interior of periphery 416 of opening 406 in some embodiments. In other embodiments (not shown), a portion of flaps 314 may be formed exterior of periphery 416 of opening 406, such that this portion of each flap is located between a periphery 420 of recess 404 and periphery 416.

FIG. 10 shows a cross-section of receptacle 100 along line 10-10 in FIG. 6, according to an embodiment. As shown in FIG. 10, first chamber 202 and second chamber 204 each contain fluid 600. Fluid conduit 210 fluidly couples first chamber 202 to second chamber 204, such that a portion of fluid 600 flows from second chamber 204 into first chamber 202 as a portion of fluid 600 is removed from first chamber 202. Again, receptacle 100 may include conduit 212 that fluidly couples first chamber 202 and second chamber 204 at a position above the level of fluid 600, thereby equalizing the air pressure between first chamber 202 and second chamber 204 as described above.

As shown in FIG. 10, first chamber 202 and second chamber 204 are initially fluidly sealed with seal 214 that covers openings 206 and 208. Lid 400 is disposed above seal 214 such that septum 300 is disposed between cover 401 of lid 400 and seal 214 affixed to body surface 222. Accordingly, seal 214 may be disposed between septum 300 and body surface 222 defining opening 206. In some embodiments, septum 300 is axially aligned with the center of first chamber 202, such that septum 300 covers the area defined by first chamber opening 206.

In some embodiments, second chamber 204 and first and second conduits 210 and 212 can be omitted from body 200.

Figure 15:
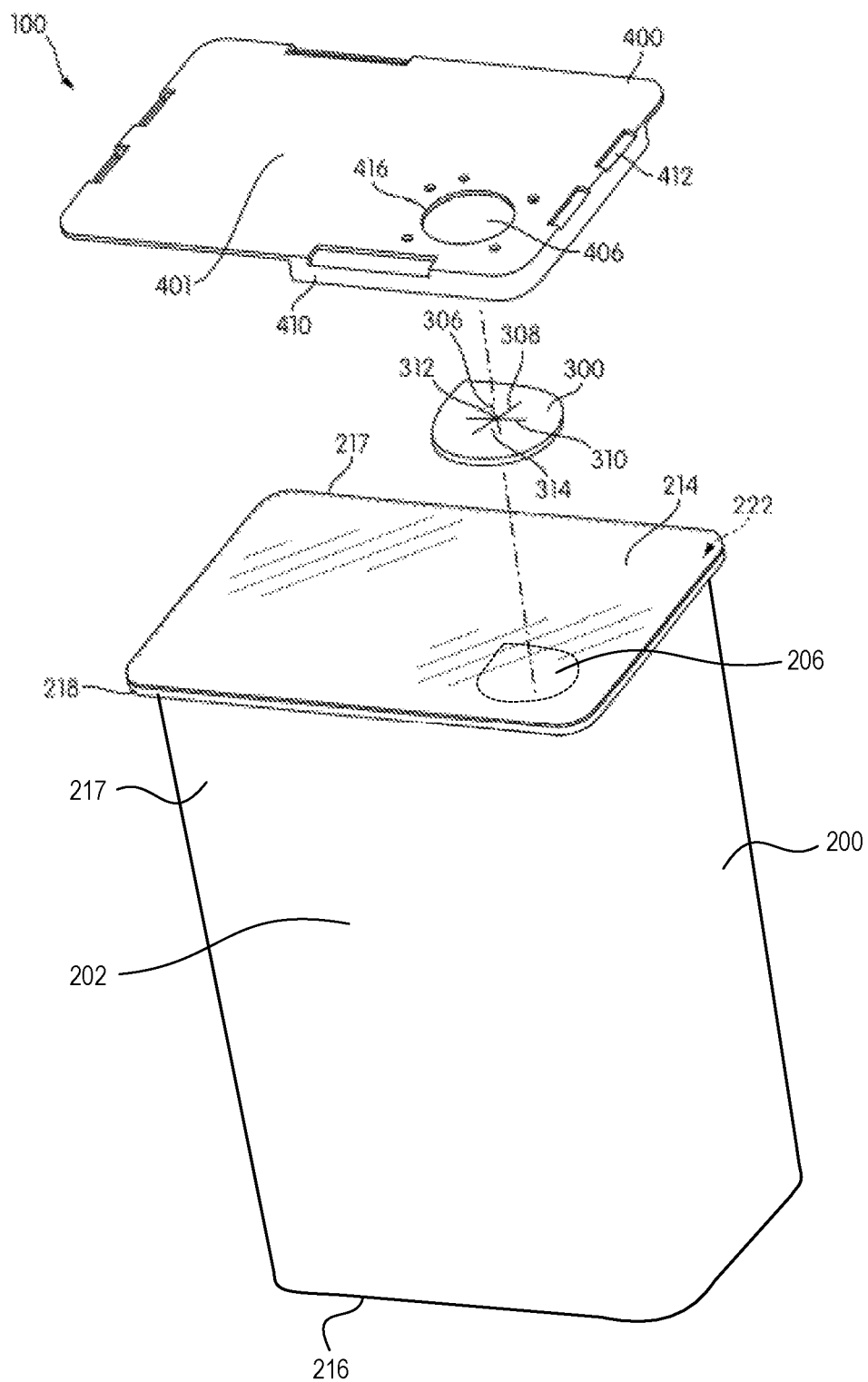
FIG. 15 is an exploded perspective view of a receptacle having only one chamber, according to an embodiment.

Accordingly, in some embodiments, receptacle 100 may include body 200 defining only one chamber, first chamber 202, having first chamber opening 206. FIG. 15 illustrates one such exemplary single chamber embodiment in which body 200 defines only one chamber 202 containing fluid 600. As shown in FIG. 15, receptacle 100 may also include fluid-tight seal 214 affixed to body 200 and fluidly sealing first chamber 202; septum 300 covering first chamber opening 206 and fluid-tight seal 214; and lid 400 coupled to body 200 and securing septum 300 to body 200 such that septum 300 is disposed between lid 400 and fluid-tight seal 214. Although opening 206 of chamber 202 is illustrated in FIG. 15 as having substantially the same tear-drop shape as opening 206 in the dual chamber embodiments illustrated, for example, in FIGS. 1, 3, 11, and 12, opening 206 of the single chamber embodiments may be any other suitable shape that allows fluid retrieval device 502 to access single chamber 202. In such one chamber embodiments, first chamber 202 may be reconfigured (e.g., resized) to contain a larger volume of fluid 600. For example, first chamber 202 can be configured as a single substantially rectangular prism that matches the overall substantially rectangular prism shape of body 200, in some embodiments. Single first chamber 202 may be configured to contain an amount of fluid 600 sufficient to perform about 50 to about 2,000 assays. In other embodiments, single first chamber 202 may contain an amount of fluid 600 for performing less than about 50 assays, or more than about 2,000 assays.

Exemplary Fluid Transfer Methods

Exemplary methods of transferring fluid 600 contained in any one of the above described embodiments of receptacle 100 (including, for example, the single and dual chamber embodiments of receptacle 100) to another receptacle will now be described. During exemplary fluid transfer methods, evaporation of fluid 600 contained in receptacle 100 is minimized due to septum 300.

One exemplary method of transferring fluid 600 from receptacle 100 will now be described in detail with reference to FIG. 10. In some embodiments, the method includes the following steps: (1) inserting a fluid retrieval device 502 (e.g., a releasably coupled pipette tip or an integral probe) of fluid transfer mechanism 500 (e.g., an automated pipettor) into first chamber 202 of receptacle 100 that contains fluid 600, (2) aspirating, some or all, of fluid 600 contained in first chamber 202 with the fluid transfer mechanism 500 via fluid retrieval device 502; (3) withdrawing fluid retrieval device 502 from first chamber 202; and (4) dispensing the aspirated fluid into another receptacle (not shown in FIG. 10) using fluid transfer mechanism 500.

In some embodiments, the inserting step includes moving fluid transfer mechanism 500 such that a fluid retrieval device 502 (a pipette tip as illustrated) of fluid transfer mechanism 500 is aligned with opening 406 of lid 400. Fluid retrieval device 502 may be selectively coupled to or an integral component of fluid transfer mechanism 500. Fluid retrieval device 502 is configured to aspirate fluid 600. Fluid transfer mechanism 500 may be configured to move fluid retrieval device 502 at least generally upward or downward along fluid retrieval device pathway 504. As fluid retrieval device 502 moves along fluid retrieval device pathway 504 in a first direction towards chamber 202, fluid retrieval device 502 of fluid transfer mechanism 500 passes through opening 406 of lid 400. As fluid retrieval device 502 passes through opening 406, fluid retrieval device 502 contacts and applies a force to flaps 314 formed in septum 300. The magnitude of the force necessary to penetrate through septum 300 will depend on the materials composing septum 300 and the structure of septum 300. In some embodiments, the magnitude of this force is less than about 20N. The force applied by fluid retrieval device 502 causes flaps 314 to flex downward in the direction toward first chamber 202 as fluid retrieval device 502 penetrates the septum 300. In some embodiments in which slits 306, 308, and 310 are not initially formed through the entire septum 300, the applied force is sufficient to tear the portion of septum 300 connecting flaps 314.

In some embodiments, fluid retrieval device 502 pierces seal 214 as fluid retrieval device 502 penetrates septum 300. As previously noted, seal 214 may be frangible and made of a sufficiently rigid material such that the hole formed in seal 214 by fluid retrieval device 502 is not substantially larger than the largest diameter of the fluid retrieval device 502 passing through seal 214. In some embodiments, the material composing seal 214 also allows tears to form around the periphery of the hole formed in seal 214 by fluid retrieval device 502. As discussed above, these tears can prevent a hermetic seal from forming between the fluid retrieval device 502 and seal 214, which helps prevent a vacuum from forming in first chamber 202 as fluid is aspirated. In other embodiments, instead of or in addition to forming tears due to the material properties of seal 214, fluid transfer mechanism 500 advances through seal 214 to align a portion having a wider dimension than fluid retrieval device 502 with seal 214, and then slightly withdrawing fluid transfer mechanism 500. This action can create a hole in seal 214 that is slightly larger than the dimension of fluid retrieval device 502, thereby creating a small vacuum preventing gap between fluid retrieval device 502 and seal 214.

As fluid retrieval device 502 advances into first chamber 202, flaps 314 flex downward in the direction of travel of fluid retrieval device 502. As shown in FIG. 10, when fluid retrieval device 502 has passed into first chamber 202 and downward travel of fluid transfer mechanism 500 stops, flaps 314 are displaced to their most extreme position. Flaps 314 may be biased to remain substantially parallel (e.g., horizontal) to surface 222 supporting septum 300, such that flaps 314 are biased toward and contact either a portion of fluid transfer mechanism 500 or fluid retrieval device 502 during an aspiration. FIG. 10 shows the ends of flaps 314 in contact with fluid retrieval device 502. In some embodiments, this contact generates at least a partial fluid seal that also limits exposure of fluid 600 to ambient conditions, thereby further limiting evaporation of fluid 600 from receptacle 100.

Fluid transfer mechanism 500 moves fluid retrieval device 502 downward such that fluid retrieval device 502 contacts the surface of fluid 600. Level sensing (e.g., capacitive level sensing using a conductive fluid retrieval device 502, or barometric level sensing) may be performed to determine when to stop movement of fluid retrieval device 502. In other embodiments, instead of level sensing, fluid transfer mechanism 500 may move fluid retrieval device 502 to a pre-set fixed height.

Fluid transfer mechanism 500 may then start aspirating fluid 600 from first chamber 202 using fluid retrieval device 502. In some embodiments, before starting aspiration and after first detecting contact between fluid retrieval device 502 and the surface of fluid 600 (via level sensing), fluid transfer mechanism 500 may move fluid retrieval device 502 further downward a pre-set fixed distance to ensure fluid retrieval device 502 is submerged in fluid 600. In some embodiments, fluid transfer mechanism 500 aspirates an aliquot of fluid 600 contained in first chamber 202 using fluid retrieval device 502. In some embodiments, fluid transfer mechanism 500 continues to move fluid retrieval device 502 downward along pathway 504 while concurrently aspirating fluid 600.

As fluid 600 is aspirated from first chamber 202, fluid 600 may flow from second chamber 204 into first chamber 202 via fluid conduit 210. Air may simultaneously move between the portion of first chamber 202 above fluid 600 and the portion of second chamber 204 above fluid 600 via conduit 212 as the pressure in the first chamber 202 and the second chamber 204 is equalized, thereby preventing a vacuum from forming in second chamber 204 and retarding the flow of fluid 600 from second chamber 204 into first chamber 202 via fluid conduit 210.

Following aspiration of fluid 600, fluid transfer mechanism 500 moves upward along pathway 504 in an upward direction away from first chamber 202, withdrawing fluid retrieval device 502 from first chamber 202. As fluid retrieval device 502 is withdrawn from first chamber 202, flaps 314 may start to return to their initial position—a position at which flaps 314 are substantially parallel with surface 222 in some embodiments. When fluid retrieval device 502 is fully withdrawn from receptacle 100, flaps 314 may substantially return to their initial position, thereby substantially covering first chamber opening 206. By covering first chamber opening 206, septum 300 further limits exposure of fluid 600 under ambient conditions, thus, minimizing evaporation of fluid 600 from receptacle 100.

In some embodiments, fluid transfer mechanism 500 does not aspirate fluid directly from second chamber 204. And fluid retrieval device 502 of fluid transfer mechanism 500 does not pass through second chamber opening 208 into second chamber 204. That is, fluid transfer mechanism 500 only aspirates fluid 600 directly from first chamber 202 through first chamber opening 206, not second chamber 204. Accordingly, septum 300 only covers first chamber opening 206 of first chamber 202 in some embodiments.

One exemplary method of transferring fluid 600 from receptacle 100 defining only one chamber 202 (for example, receptacle 100 illustrated in FIG. 15) includes steps substantially similar to the above described fluid transfer steps. For example, the method can include inserting a fluid retrieval device 502 (e.g., a releasably coupled pipette tip or an integral probe) of fluid transfer mechanism 500 (e.g., an automated pipettor) into the only chamber 202 of receptacle 100 that contains fluid 600, (2) aspirating some or all of fluid 600 contained in chamber 202 with the fluid transfer mechanism 500 via fluid retrieval device 502; (3) withdrawing fluid retrieval device 502 from first chamber 202; and (4) dispensing the aspirated fluid into another receptacle (not shown in FIG. 10) using fluid transfer mechanism 500. When fluid retrieval device 502 is fully withdrawn from receptacle 100, flaps 314 of septum 300 may substantially return to their initial position, thereby substantially covering first chamber opening 206 of the only chamber 202 containing fluid 600. By covering first chamber opening 206, septum 300 further limits exposure of fluid 600 under ambient conditions, thus minimizing evaporation of fluid 600 from receptacle 100.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A receptacle for minimizing evaporation of a fluid, comprising:
    a single-piece body comprising:
        a first chamber having a first chamber volume and a first chamber opening, the first chamber containing a first portion of a fluid,
        a second chamber having a second chamber volume, a second chamber opening separate from the first chamber opening, the second chamber containing a second portion of the fluid,
        a first conduit configured to allow fluid communication between the first chamber and the second chamber, and
        a second conduit configured to allow fluid communication between the first chamber and the second chamber;
    one or more fluid-tight seals affixed to a surface of the body, the surface of the body defining the first and second chamber openings, wherein at least a portion of the one or more fluid-tight seals covers the first chamber opening and is frangible;
    a penetrable septum covering the first chamber opening and the portion of the one or more fluid-tight seals; and
    a lid having an opening axially aligned with the first chamber opening and coupled to the body such that at least a portion of the septum is disposed between the lid and the one or more fluid-tight seals,
    wherein the septum comprises at least one slit forming flaps.

2. The receptacle of claim 1, wherein the septum does not cover any portion of the second chamber opening.

3. The receptacle of claim 1, wherein the second chamber volume is greater than the first chamber volume.

4. The receptacle of claim 1, wherein the second chamber opening is larger than the first chamber opening.

5. The receptacle of claim 1, wherein the fluid is at substantially the same level in each of the first and second chambers.

6. The receptacle of claim 1, wherein the receptacle is self-standing.

7. The receptacle of claim 6, wherein the receptacle comprises a flat bottom surface.

8. The receptacle of claim 1, wherein the one or more fluid-tight seals comprise a metallic foil.

9. The receptacle of claim 1, wherein the one or more fluid-tight seals consist of a single seal.

10. The receptacle of claim 1, wherein:
the single-piece body further comprises a wall defining at least a portion of the first chamber and at least a portion of the second chamber, and
the first conduit comprises an opening defined by the wall.

11. The receptacle of claim 1, wherein the first conduit comprises a channel extending between the first chamber and the second chamber.

12. The receptacle of claim 1, wherein the first conduit is adjacent a bottom chamber-defining surface of the first chamber and a bottom chamber-defining surface of the second chamber.

13. The receptacle of claim 1, wherein the second conduit is on a side of the single-piece body opposite of the first conduit.

14. The receptacle of claim 1, wherein the second conduit comprises a recess defined by the surface of the body.

15. The receptacle of claim 14, wherein the recess is a slot extending between the first chamber and the second chamber.

16. The receptacle of claim 1, wherein the lid is configured to engage the body in a snap-fit connection.

17. The receptacle of claim 1, wherein the lid further comprises a solid portion covering the second chamber opening.

18. The receptacle of claim 1, wherein the slits bisect each other at a point aligned with a center of the opening of the lid.

19. The receptacle of claim 1, wherein the flaps are biased to be substantially positioned in a single plane.

20. The receptacle of claim 1, wherein the slits are equally spaced apart about an axis.

21. The receptacle of claim 1, wherein each slit is positioned inside a perimeter of the opening of the lid.

22. The receptacle of claim 1, wherein the lid comprises a surface facing the single-piece body, and defining a recess configured to receive at least a portion of the septum, thereby coupling the septum to the lid.

23. The receptacle of claim 22, wherein the recess is configured to create a friction fit or an interference fit with the septum.

24. The receptacle of claim 23, wherein a periphery of the recess comprises protrusions engaging the septum to create an interference fit.

25. The receptacle of claim 1, wherein the septum comprises a first layer and a second layer.

26. The receptacle of claim 25, wherein the first layer of the septum comprises polytetrafluoroethylene.

27. The receptacle of claim 25, wherein the second layer of the septum comprises silicone.

28. The receptacle of claim 25, wherein the second layer of the septum is between the first chamber opening and the first layer of the septum.

29. The receptacle of claim 1, wherein the fluid is a reagent for performing an assay on a sample.

30. The receptacle of claim 29, wherein the reagent comprises at least one of a solution for reconstituting a dried reagent, an elution buffer, and oil.

31. A method of transferring a fluid, the method comprising the steps of:
inserting a fluid retrieval device into a first chamber of a first receptacle that contains a first portion of the fluid, wherein the inserting the fluid retrieval device into the first chamber comprises:
passing the fluid retrieval device through a penetrable septum covering a first chamber opening of the first chamber, wherein the septum does not cover any portion of a second chamber opening of a second chamber of the first receptacle, the second chamber being in fluid communication with the first chamber, and
penetrating a frangible seal sealing the first chamber opening, the frangible seal being between the first chamber opening and the septum;
aspirating some or all of the first portion of the fluid contained in the first chamber with the fluid retrieval device, wherein a second portion of the fluid flows into the first chamber from the second chamber of the first receptacle, and levels of the fluid being substantially the same in the first and second chambers after the second portion of the fluid flows into the first chamber; and
withdrawing the fluid retrieval device from the first chamber and the septum such that the septum substantially covers the first chamber opening.

32. The method of claim 31, wherein the second chamber has a second chamber volume greater than a first chamber volume of the first chamber.

33. The method of claim 31, wherein the fluid contained in the receptacle is not aspirated through the second chamber opening, and wherein the second chamber remains sealed during the inserting, aspirating, and withdrawing steps.

34. The method of claim 31, wherein the frangible seal comprises a metallic foil.

35. The method of claim 31, wherein the frangible seal seals the second chamber opening.

36. The method of claim 31, further comprising, after the aspirating step, the step of dispensing an aspirated portion of the first portion of the fluid into a second receptacle using the fluid retrieval device.

37. The method of claim 36, wherein the second receptacle contains an assay reagent.

38. The method of claim 37, wherein the assay reagent comprises a dried reagent, and wherein the fluid comprises a solution for reconstituting the dried reagent.

39. The method of claim 31, wherein the fluid comprises at least one of a solution for reconstituting a dried reagent, an elution buffer, and oil.

40. The method of claim 31, wherein the withdrawing step comprises disengaging the fluid retrieval device from flaps of the septum, such that the flaps return to a position that substantially covers the first chamber opening.

41. The method of claim 31, wherein the receptacle comprises a single-piece body defining the first chamber and the second chamber; and wherein the septum is not affixed to the single-piece body.

42. The method of claim 41, wherein the receptacle further comprises a lid configured to be coupled to the single-piece body; and wherein the septum is coupled to the lid, thereby coupling the septum to the single-piece body.

43. The method of claim 31, further comprising the steps of:
inserting, a second time, the fluid retrieval device into the first chamber such that the fluid retrieval device passes through the penetrable septum covering the first chamber opening of the first chamber;

aspirating, a second time, some or all of the first portion of the fluid contained in the first chamber with the fluid retrieval device; and withdrawing, a second time, the fluid retrieval device from the first chamber and the septum such that the septum substantially covers the first chamber opening.

44. A method of transferring a fluid, the method comprising the steps of:

inserting a fluid retrieval device into the first chamber of the receptacle as claimed in claim 1, the fluid retrieval device being affixed to or a component of a fluid transfer mechanism, wherein the inserting the fluid retrieval device into the first chamber comprises:

passing the fluid retrieval device through the penetrable septum covering the first chamber opening of the first chamber, and penetrating the portion of the one or more fluid-tight seals covering the first chamber opening;

aspirating some or all of the first portion of the fluid contained in the first chamber with the fluid retrieval device, wherein the second portion of the fluid flows into the first chamber from the second chamber of the receptacle, wherein levels of the fluid are substantially the same in the first and second chambers after the second portion of the fluid flows into the first chamber; and withdrawing the fluid retrieval device from the first chamber and the septum such that the septum substantially covers the first chamber opening.

\* \* \* \* \*